(12) United States Patent
Sasaki et al.

(10) Patent No.: US 8,400,411 B2
(45) Date of Patent: Mar. 19, 2013

(54) LIQUID CRYSTAL DISPLAY DEVICE AND LIQUID CRYSTAL DISPLAY APPARATUS

(75) Inventors: Kazuhiro Sasaki, Sagamihara (JP); Hisatoshi Mori, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 569 days.

(21) Appl. No.: 12/568,819

(22) Filed: Sep. 29, 2009

(65) Prior Publication Data

US 2010/0079396 A1 Apr. 1, 2010

(30) Foreign Application Priority Data

Sep. 29, 2008 (JP) ................. 2008-251176

(51) Int. Cl.
*G06F 3/041* (2006.01)
(52) U.S. Cl. .......... 345/173; 345/174; 345/87; 345/103
(58) Field of Classification Search ............ 345/87, 345/103, 173, 174
See application file for complete search history.

(56) References Cited

U.S. PATENT DOCUMENTS

| | | | |
|---|---|---|---|
| 5,867,151 A | 2/1999 | Nakai | |
| 6,603,525 B2* | 8/2003 | Yamakita et al. | 349/139 |
| 6,922,183 B2* | 7/2005 | Ting et al. | 345/87 |
| 7,209,198 B2 | 4/2007 | Park et al. | |
| 7,675,580 B2* | 3/2010 | Rho | 349/12 |
| 8,031,275 B2* | 10/2011 | Lee | 349/12 |
| 8,049,735 B2* | 11/2011 | Lee et al. | 345/173 |
| 8,253,669 B2* | 8/2012 | Ina et al. | 345/87 |
| 2006/0262100 A1 | 11/2006 | Van Berkel | |
| 2007/0070047 A1 | 3/2007 | Jeon et al. | |
| 2007/0097278 A1 | 5/2007 | Rho et al. | |
| 2007/0188697 A1* | 8/2007 | Oh et al. | 349/156 |
| 2010/0033448 A1 | 2/2010 | Koito et al. | |

FOREIGN PATENT DOCUMENTS

| | | |
|---|---|---|
| JP | 3-20817 A | 1/1991 |
| JP | 7-182106 A | 7/1995 |
| JP | 9-80467 A | 3/1997 |

(Continued)

OTHER PUBLICATIONS

Japanese Office Action dated Sep. 7, 2010 (and English translation thereof) in counterpart Japanese Application No. 2008-251176.

(Continued)

*Primary Examiner* — Joseph Haley
*Assistant Examiner* — Linh N Hoffner
(74) *Attorney, Agent, or Firm* — Holtz, Holtz, Goodman & Chick, P.C.

(57) ABSTRACT

A liquid crystal display device includes first and second substrates arranged to face each other with a predetermined gap, and a liquid crystal layer sealed between the first and second substrates. The first substrate includes pixel electrodes and thin-film transistors connected with the pixel electrodes. The transistors are turned on based on a scanning signal from scanning lines to electrically connect the pixel electrodes to signal lines. The second substrate has an opposed electrode, which forms pixels in areas facing the pixel electrodes. The device also has a touch input contact point provided on either the pixel electrodes or the opposed electrode to correspond to a previously selected pixel. The contact point protrudes at a height smaller than the gap between the first and second substrates and is brought into conduction by flexural deformation caused by a pressing force of a touch onto the first or second substrates.

27 Claims, 17 Drawing Sheets

FOREIGN PATENT DOCUMENTS

| | | |
|---|---|---|
| JP | 9-258893 A | 10/1997 |
| JP | 2005-157392 A | 6/2005 |
| JP | 2007-503640 A | 2/2007 |
| JP | 2007-58070 A | 3/2007 |
| JP | 2007-95044 A | 4/2007 |
| JP | 2007-128091 A | 5/2007 |
| JP | 2008-216423 A | 9/2008 |
| JP | 2010-39380 A | 2/2010 |
| KR | 10-2004-0022354 A | 3/2004 |
| KR | 10-2007-0109180 A | 11/2007 |

OTHER PUBLICATIONS

Japanese Office Action dated Aug. 30, 2011 (and English translation thereof) in counterpart Japanese Application No. 2008-251176.

Korean Office Action dated Mar. 9, 2011 (and English translation thereof) in counterpart Korean Application No. 10-2009-0090800.

* cited by examiner

LIQUID CRYSTAL DISPLAY DEVICE AND LIQUID CRYSTAL DISPLAY APPARATUS

CROSS-REFERENCE TO RELATED APPLICATIONS

This application is based upon and claims the benefit of priority from prior Japanese Patent Application No. 2008-251176, filed Sep. 29, 2008, the entire contents of which are incorporated herein by reference.

BACKGROUND OF THE INVENTION

1. Field of the Invention

The present invention relates to a liquid crystal display device including a resistive touch panel function and a liquid crystal display apparatus.

2. Description of the Related Art

An active matrix liquid crystal display device that includes a pair of substrates, i.e., a first substrate and a second substrate, and has a touch panel function has a configuration in which a plurality of sensor electrodes are provided in portions between a plurality of pixel electrodes on the first substrate to be insulated from the pixel electrodes, a plurality of protruding electrodes are provided to the second substrate to face the plurality of sensor electrodes, and the plurality of sensor electrodes and the plurality of protruding electrodes form a plurality of touch sensors in which the protruding electrodes come into contact with the sensor electrodes by flexural deformation caused due to pressing force acting on an outer surface of the liquid crystal display device.

BRIEF SUMMARY OF THE INVENTION

A liquid crystal display device according to an aspect of the present invention includes: a first substrate; a second substrate arranged to face the first substrate with a predetermined gap; a plurality of pixel electrodes provided to be arranged on the first substrate; a plurality of thin-film transistors, arranged on the first substrate to be connected with the plurality of pixel electrodes, respectively, to be turned on based on a scanning signal from scanning lines to electrically connect the pixel electrodes to signal lines through which a data signal is supplied; an opposed electrode provided on the second substrate to face the plurality of pixel electrodes so as to form a plurality of pixels in areas facing the plurality of pixel electrodes; a touch input contact point, provided on either the pixel electrodes or the opposed electrode to protrude at a height smaller than the gap between the first substrate and the second substrate so as to correspond to at least a previously selected pixel in the plurality of pixels, respectively, to be brought into conduction with the other electrode by flexural deformation caused by a pressing force of a touch onto the first substrate or the second substrate; and a liquid crystal layer sealed in the gap between the first substrate and the second substrate.

A liquid crystal display apparatus according to another aspect of the present invention includes a liquid crystal display device and a driver, and the liquid crystal display device includes: a first substrate; a second substrate arranged to face the first substrate with a predetermined gap; a plurality of pixel electrodes provided to be arranged in row and column directions on the first substrate; a plurality of thin-film transistors, arranged on the first substrate to be connected with the plurality of pixel electrodes, respectively, to be turned on based on a scanning signal from scanning lines to electrically connect the pixel electrodes to signal lines through which a data signal is supplied; an opposed electrode provided on the second substrate to face the plurality of pixel electrodes so as to form a plurality of pixels in areas facing the plurality of pixel electrodes; a touch input contact point, provided on either the pixel electrodes or the opposed electrode to protrude at a height smaller than the gap between the first and second substrates so as to correspond to at least a previously selected pixel in the plurality of pixels, respectively, to be brought into conduction with the other electrode by flexural deformation caused by a pressing force of a touch onto the first substrate or the second substrate; and a liquid crystal layer sealed in the gap between the first substrate and the second substrate, and the driver selectively performs image data writing of sequentially turning on the plurality of thin-film transistors and supplying an image data signal from the signal lines to the plurality of respective pixel electrodes to apply a voltage corresponding to the image data signal to a space between the pixel electrodes and the opposed electrode; and touch input detection of sequentially turning on the thin-film transistors to detect a potential in each of the plurality of signal lines during a period other than a period that the image data is written.

A liquid crystal display device according to still another aspect of the present invention includes: a first substrate; a second substrate arranged to face the first substrate with a predetermined gap; a plurality of pixel electrodes provided to be arranged on the first substrate; scanning lines arranged between the plurality of pixel electrodes; signal lines arranged between the plurality of pixel electrodes to be vertical to the scanning lines; a plurality of thin-film transistors, arranged to be connected with the plurality of pixel electrodes, respectively, to be turned on based on a scanning signal from the scanning lines to electrically connect the pixel electrodes to the signals lines through which a data signal is supplied; an opposed electrode provided on the second substrate to face the plurality of pixel electrodes so as to form a plurality of pixels in areas facing the plurality of pixel electrodes; a plurality of touch input contact points, provided on either the pixel electrodes or the opposed electrode to protrude at a height smaller than the gap between the first substrate and the second substrate so as to correspond to at least a plurality of previously selected pixels in the plurality of pixels, respectively, to be brought into conduction with the other electrode by flexural deformation caused by a pressing force of a touch onto the first substrate or the second substrate; and a liquid crystal layer sealed in the gap between the first substrate and the second substrate.

A liquid crystal display apparatus according to a further aspect of the present invention includes a liquid crystal display device and a driver, and the liquid crystal display device includes: a first substrate; a second substrate arranged to face the first substrate with a predetermined gap; a plurality of pixel electrodes provided to be arranged on the first substrate; scanning lines arranged between the plurality of pixel electrodes; signal lines arranged between the plurality of pixel electrodes to be vertical to the scanning lines; a plurality of thin-film transistors, arranged to be connected with the plurality of pixel electrodes, respectively, to be turned on based on a scanning signal from the scanning lines to electrically connect the pixel electrodes to the signal lines through which a data signal is supplied; an opposed electrode provided on the second substrate to face the plurality of pixel electrodes so as to form a plurality of pixels in areas facing the plurality of pixel electrodes; a plurality of touch input contact points, provided on either the pixel electrodes or the opposed electrode to protrude at height smaller than the gap between the first and second substrates so as to correspond to at least a plurality of previously selected pixels in the plurality of pixels, respectively, to be brought into conduction with the other electrode by flexural deformation caused by a pressing force of a touch onto the first substrate or the second substrate; and a liquid crystal layer sealed in the gap between the first substrate and the second substrate, and the driver selectively performs image data writing of sequentially turning on the plurality of thin-film transistors and supplying an image data signal to the plurality of respective pixel electrodes to apply a voltage corresponding to the image data signal to a space between the pixel electrodes and the opposed electrode; and touch input detection of sequentially turning on the thin-film transistors to detect a potential in each of the plurality of signal lines during a period other than a period that the image data is written when the plurality of thin-film transistors are in an ON period.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
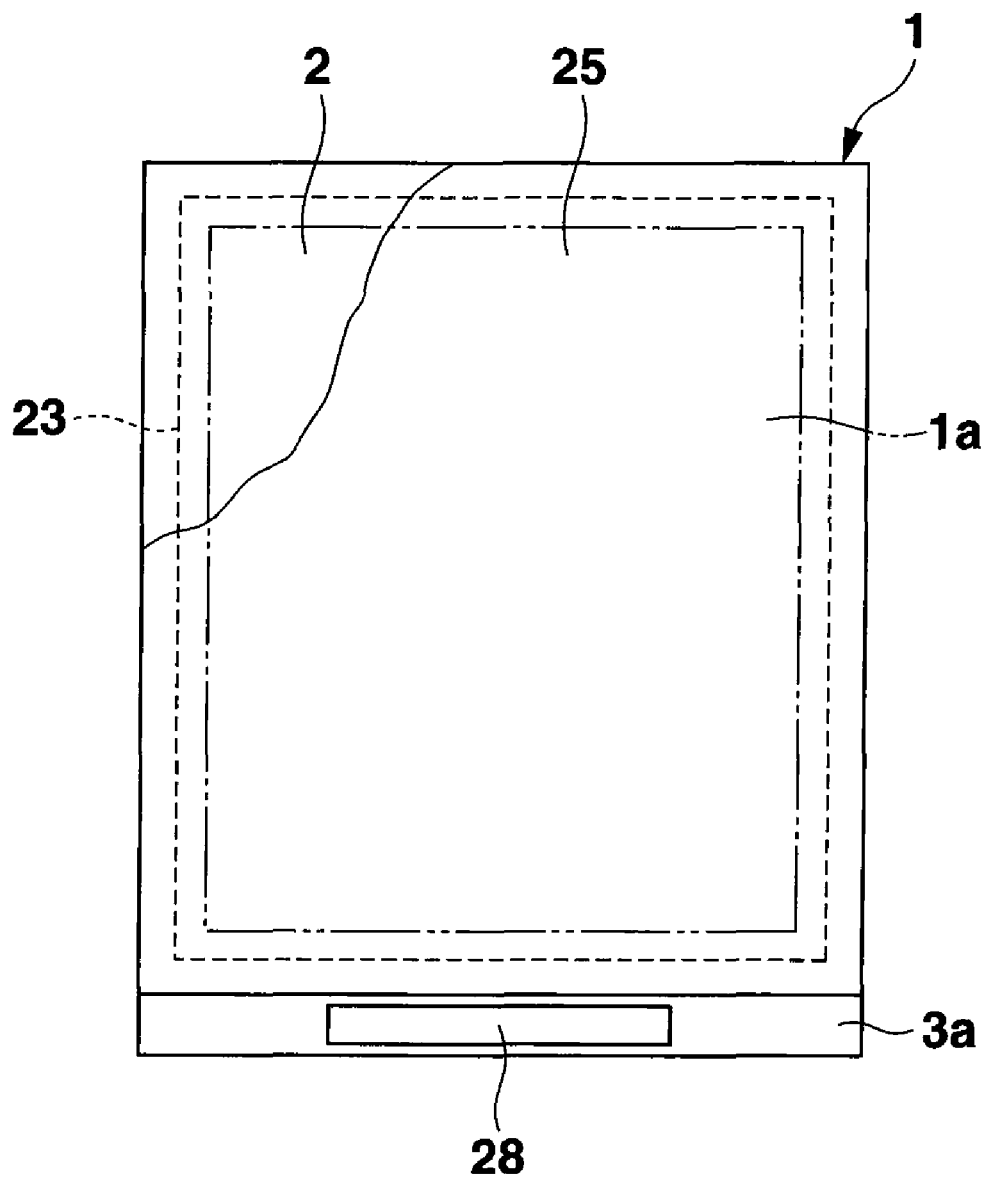
FIG. 1 is a plan view of a liquid crystal display apparatus showing a first embodiment according to the present invention.
Figure 2:
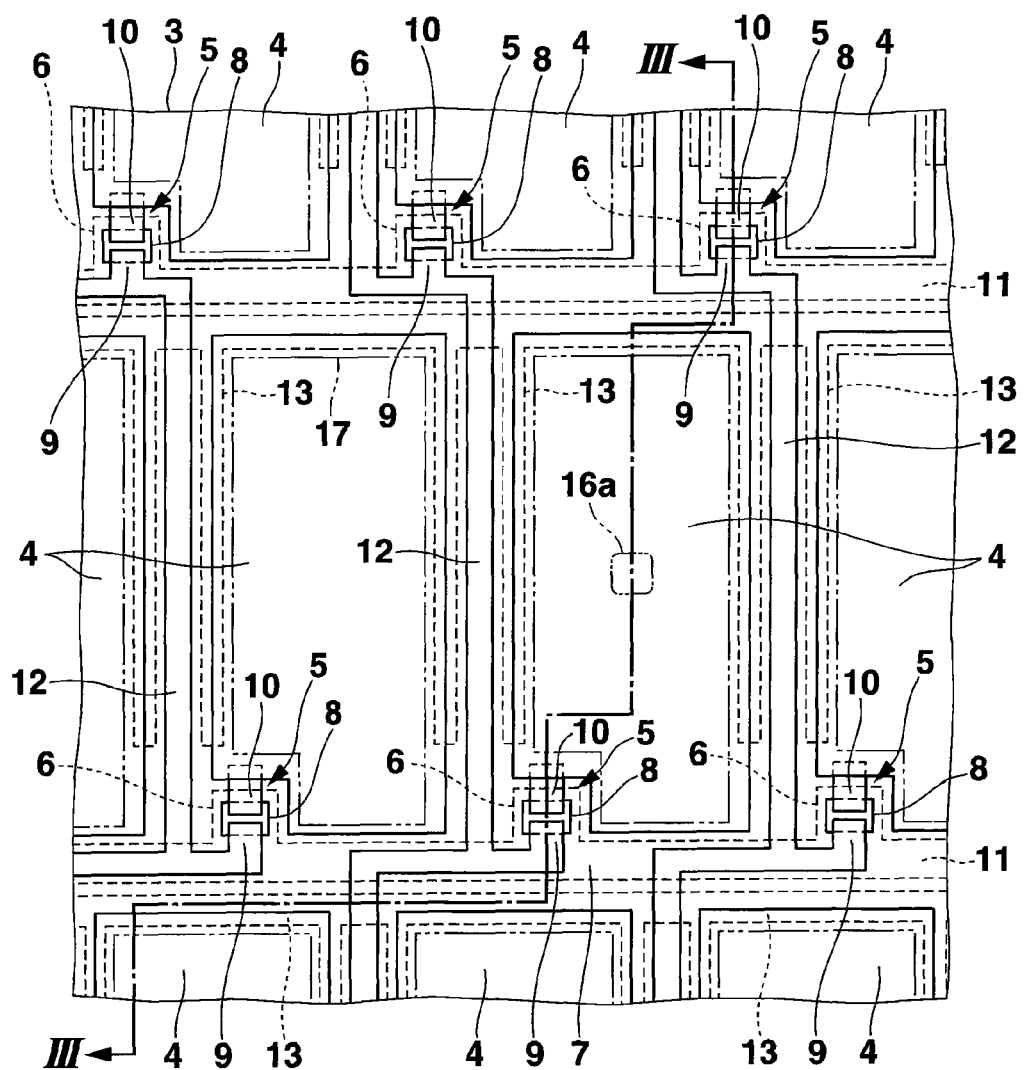
FIG. 2 is a plan view showing a part of one substrate of a liquid crystal display device in the liquid crystal display apparatus according to the first embodiment.
Figure 3:
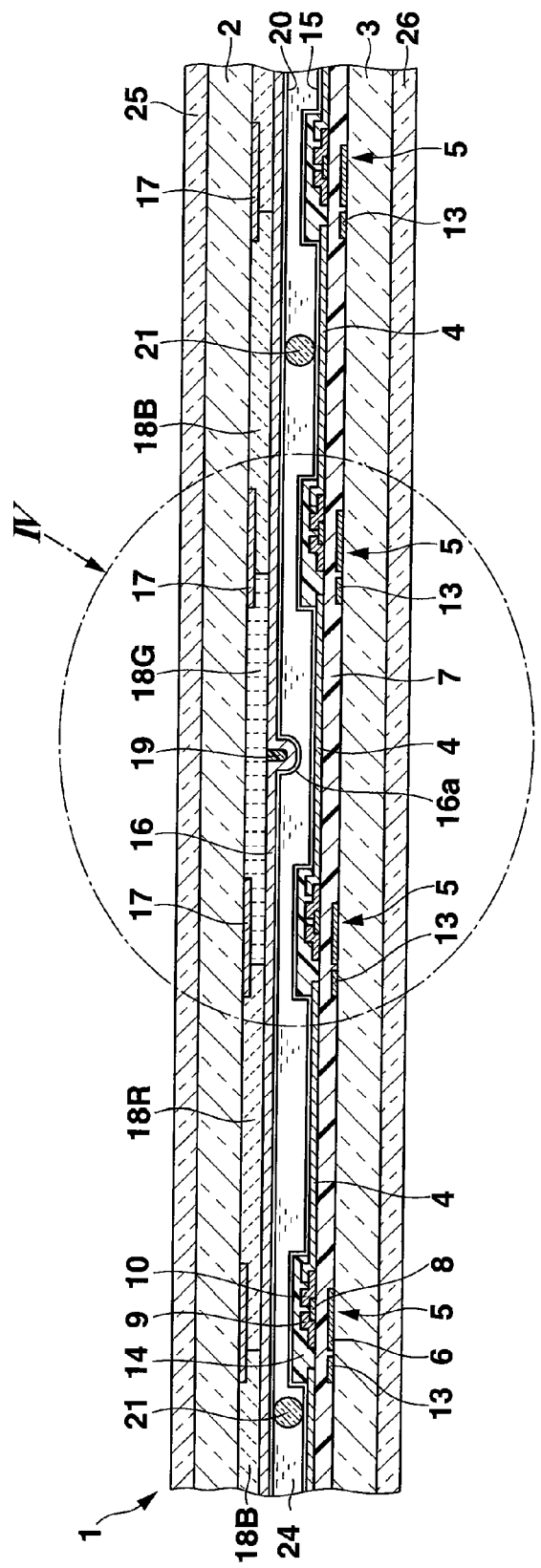
FIG. 3 is a cross-sectional view of the liquid crystal display device taken along a line III-III in FIG. 2.
Figure 4:
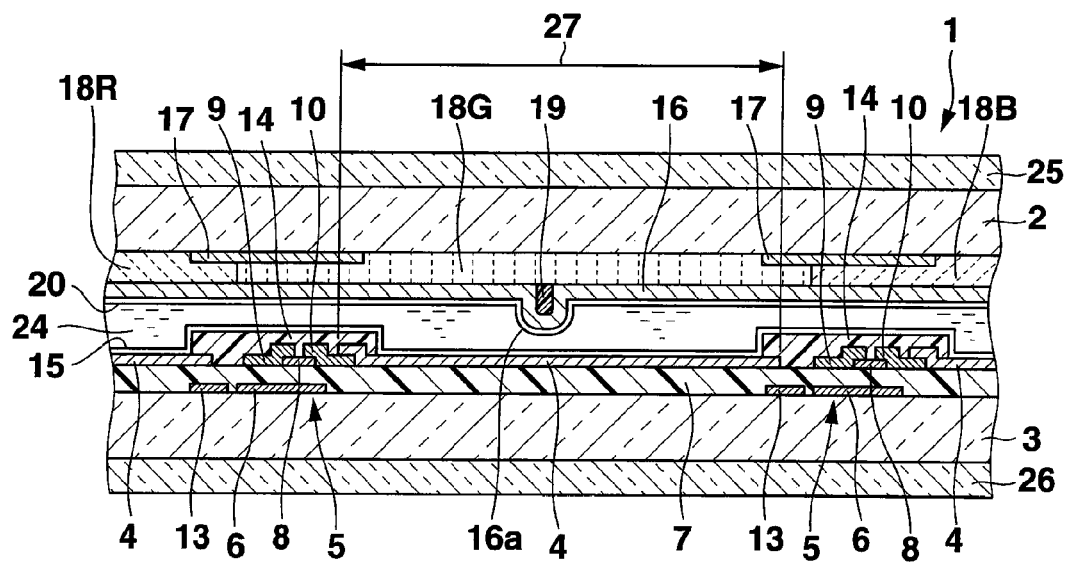
FIG. 4 is an enlarged view of a part IV in FIG. 3.

FIG. 1 is a plan view of a liquid crystal display apparatus showing a first embodiment of the present invention, FIG. 2 is a plan view of a part of one substrate of a liquid crystal display device constituting the liquid crystal display apparatus, FIG. 3 is a cross-sectional view of the liquid crystal display device taken along a line III-III, and FIG. 4 is an enlarged view of a part IV in FIG. 3.

This liquid crystal display device 1 is an active matrix liquid crystal display device including a thin-film transistor (which will be referred to as a TFT hereinafter) as an active device, and it includes: a first substrate 3; a second substrate 2 arranged to face the first substrate 3 with a predetermined gap; a plurality of transparent pixel electrodes 4 provided on one of opposed substrate surfaces (inner surfaces) of the first substrate and the second substrate, e.g., an inner surface of the first substrate (which will be referred to as a rear substrate hereinafter) 3 and aligned in row and column directions; a plurality of TFTs 5, which are arranged to be connected with the plurality of pixel electrodes 4, respectively, to be turned on based on a scanning signal (a gate signal) from each scanning line 11 to electrically connect each pixel electrode 4 to each signal line 12 through which a data signal is supplied; one film-like transparent opposed electrode 16 provided on the second substrate (which will be referred to as a front substrate hereinafter) 2 on a display side to face the plurality of pixel electrodes 4 so as to form a plurality of pixels 27 in areas facing the plurality of pixel electrodes 4; a liquid crystal layer 24 sealed in the gap between the pair of substrates 2 and 3; and a pair of polarizing plates 25 and 26 arranged on outer surfaces of the pair of substrates 2 and 3, respectively.

The TFT 5 is formed of a gate electrode 6 formed on the rear substrate 3, a transparent gate insulating film 7 formed over an entire arrangement region of the plurality of pixel electrodes 4 to cover the gate electrode 6, an i-type semiconductor film 8 formed on the gate insulating film 7 to face the gate electrode 6, and a drain electrode 9 and a source electrode 10 formed on one side portion and the other side portion of the i-type semiconductor film 8 through an n-type semiconductor film (an ohmic contact layer).

Further, each scanning line 11 is provided on one side of each pixel electrode row formed of each of the plurality of pixel electrodes 4 arranged in the row direction on the rear substrate 3 in accordance with each pixel electrode row, and it is connected with the gate electrode 6 of each of the plurality of TFTs 5 in the respective rows. Each signal line 12 is provided on one side of each pixel electrode column formed of each of the plurality of pixel electrodes 4 arranged in the column direction on the gate insulating film 7 in accordance with each pixel electrode column, and it is connected with the drain electrode 9 of each of the plurality of TFTs 5 in the respective columns.

Furthermore, each of the plurality of pixel electrodes 4 is formed into, e.g., a vertically long rectangular shape in which a vertical width in a direction parallel to a vertical direction of a screen is larger than a horizontal width in a direction parallel to a horizontal direction of the screen on the gate insulating film 7, and the source electrode 10 of the TFT 5 corresponding to each pixel electrode 4 is connected with one end portion of this pixel electrode 4 in the vertical width direction.

The liquid crystal display device 1 according to this embodiment has a configuration where the plurality of pixel electrodes 4 are linearly arranged in the row direction and alternately staggered at a ½ pitch in accordance with each column in the column direction, the plurality of scanning lines 11 corresponding to the respective pixel electrode rows are linearly formed, and the plurality of signal lines 12 corresponding to the respective pixel electrode columns are formed into a bent shape in accordance with the arrangement shape of the plurality of the pixel electrodes 4 in the respective pixel electrode columns.

Moreover, on the rear substrate 3, corresponding to each of the pixel electrodes 4, a capacitance electrode 13 to form a compensation capacitance for holding a potential in the pixel electrode 4 is provided between the rear substrate and each of the pixel electrodes 4 through the gate insulating film 7 in accordance a peripheral portion of each pixel electrode 4. These capacitance electrodes 13 are continuously connected in accordance with each pixel electrode column, and they are connected in common at one end or both ends of each row.

Additionally, a projecting portion 3a (see FIG. 1) projecting toward the outside of the front substrate 2 is formed at one edge portion, e.g., an edge portion on one end side of the rear substrate 3 in the column direction, and a plurality of scanning line terminals and a plurality of signal line terminals associated with the plurality of scanning lines 11 and the plurality of signal lines 12, respectively, and an opposed electrode terminal associated with the opposed electrode 16 of the front substrate 2 are provided to this projecting portion 3a.

Further, the plurality of scanning lines 11 are connected with the plurality of respective scanning line terminals through a plurality of wiring lines led to the projecting portion 3a from one end of each of these scanning lines 11 through an outer region of the arrangement region for the plurality of pixel electrodes 4, the plurality of signal lines 12 are connected with the plurality of respective signal line terminal through a plurality of wiring lines led to the projecting portion 3a from one end of each of these signal lines 12, and a common connecting portion of the plurality of capacitance electrodes 13 is connected with the opposed electrode terminal through a wiring line led to the projecting portion 3a from this common connecting portion.

Furthermore, an overcoat insulating film 14 is provided on the surface of the rear substrate 3 to cover the plurality of TFTs 5 and the plurality of signal lines 12, and an aligning film 15 is provided on the entire arrangement region for the plurality of pixel electrodes 4 to cover the plurality of pixel electrodes 4.

On the other hand, a light shielding film (a black mask) 17 formed in accordance with a region between the plurality of pixels 27 arranged in a matrix constituted by areas where the plurality of pixel electrodes 4 on the inner surface of the rear substrate 3 face the opposed electrode 16 on the inner surface of the front substrate 2, and a colors filters 18R, 18G, and 18B of three colors, i.e., red, green, and blue, that are formed so as to correspond to the plurality of pixels 17 are provided on the inner surface of the front substrate 2, and the opposed electrode 16 is formed on the color filters 18R, 18G, and 18B.

The opposed electrode 16 is formed to have a contour that one of peripheral portions or a plurality of corner portions thereof are extended to portions near the edge portion of the front substrate 2, and an opposed electrode connection electrode that is arranged to face an extended portion of the opposed electrode 16 and connected with the opposed electrode terminal of the projecting portion 3a is provided on the inner surface of the rear substrate 3.

Further, this liquid crystal display device 1 includes a plurality of touch input contact points 16a that are provided on either the pixel electrodes 4 or the opposed electrode 16, e.g., the opposed electrode 16, to protrude at a height smaller than the gap between the pair of substrates 2 and 3 so as to correspond to previously selected ones in the plurality of pixels 27 arranged in the matrix shape and come into contact with the other of the electrodes, i.e., the pixel electrodes 4, by flexural deformation caused by a pressing force of a touch from the outer surface side of the front substrate 2. In this embodiment, the plurality of touch input contact points 16a are arranged in accordance with central portions of the respective pixels 27 provided at a plurality of positions.

These touch input contact points 16a are formed of a plurality of protrusions 19 provided on the inner surface of the front substrate 2 where the opposed electrode 16 is provided and a portion of the opposed electrode 16 provided on the protrusions 19 and formed to cover the plurality of protrusions 19. It is to be noted that the plurality of protrusions 19 are formed of, e.g., a light curing resin on the color filters 18R, 18G, and 18B.

Furthermore, an aligning film 20 is provided on the surface of the front substrate 2 to cover the opposed electrode 16 and the plurality of touch input contact points 16a provided on this opposed electrode 16 in the entire arrangement region of the plurality of pixels 27.

Moreover, a plurality of transparent spherical spacers 21 held between the substrates 2 and 3 to define the gap between the pair of substrates 2 and 3 to have a value larger than a protruding height of the plurality of touch input contact points 16a are arranged between the pair of substrates 2 and 3 to be substantially evenly dispersed in an entire screen area 1a (see FIG. 1) where the plurality of pixels 27 are arranged in the matrix shape.

The gap between the pair of substrates 2 and 3 is defined by the plurality of spherical spacers 21 so that these substrates 2 and 3 are arranged to face each other, and they are bonded through a frame-like sealing material 23 surrounding the screen area 1a.

Additionally, the opposed electrode 16 on the surface of the front substrate 2 is electrically connected with the opposed electrode terminal provided at the protruding portion 3a of the rear substrate 3 by electrically connecting the extended portion of the peripheral of the opposed electrode 16 and the opposed electrode connection electrode provided on the inner surface of the rear substrate through a connection member at a substrate bonding portion of the sealing member 23.

Further, the liquid crystal layer 24 is sealed in a region of the gap between the pair of substrates 2 and 3 surrounded by the sealing material 23, and liquid crystal molecules in this liquid crystal layer 24 are aligned in an alignment state defined by the aligning films 20 and 15 provided on the inner surfaces of the pair of substrates 2 and 3, respectively.

It is to be noted that this liquid crystal display device 1 is a display device of a TN type, an STN type, a hybrid alignment type, a non-twist homogeneous alignment, or a vertical alignment type, and the pair of polarizing plates 25 and 26 are arranged in such a manner that an optical axis (a transmission axis or an absorption axis) of each of these plates faces a predetermined direction.

Figure 5:
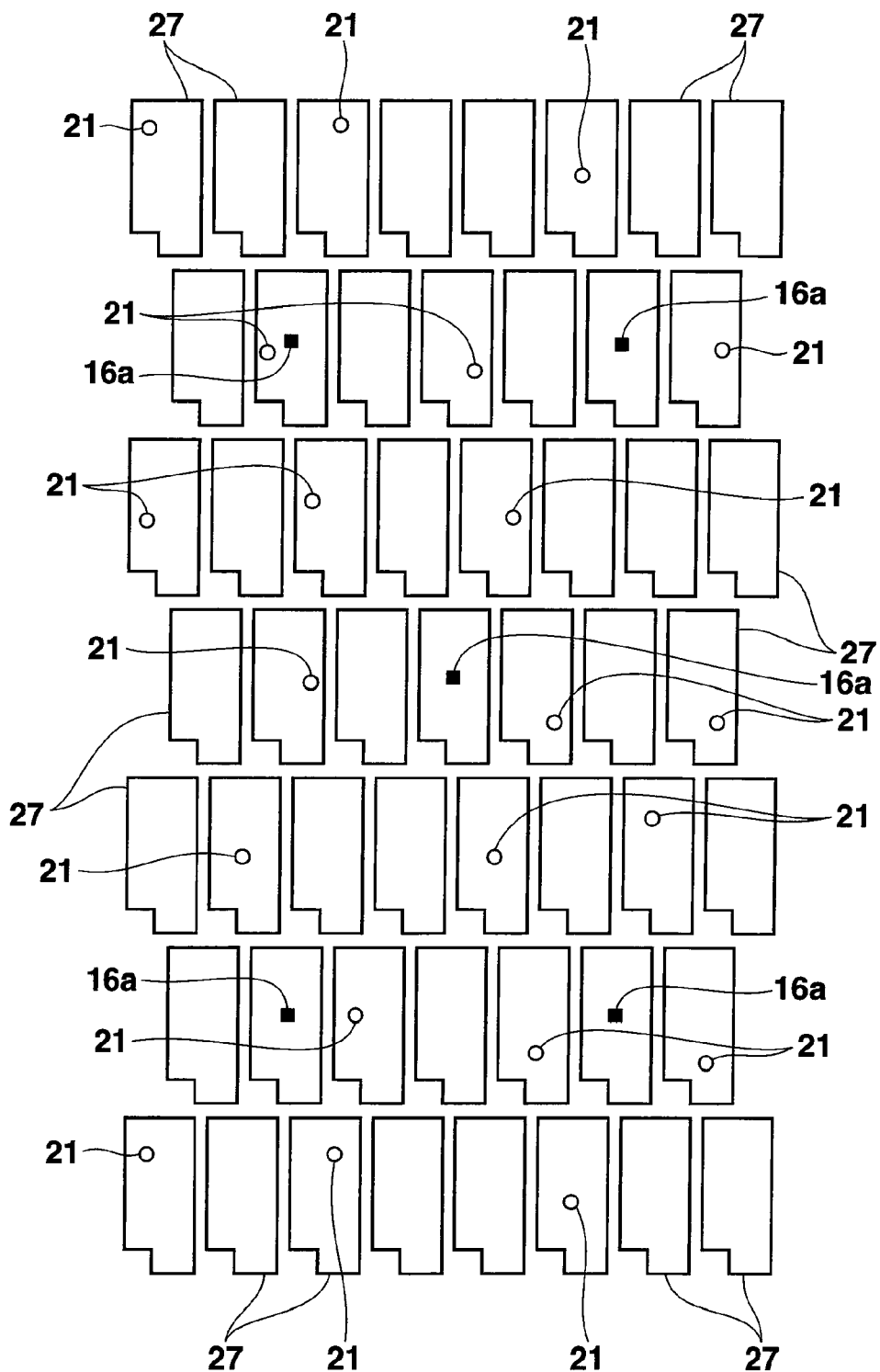
FIG. 5 is a view showing an arrangement example of a plurality of touch input contact points and spherical spacers of the liquid crystal display device.

FIG. 5 shows an arrangement example of the plurality of touch input contact points 16a and the spherical spacers 21 in the liquid crystal display device 1, and the plurality of touch input contact points 16a are arranged at a predetermined pitch in each of the row and column directions in each of the pixel rows arranged in a predetermined row pattern (every other row in FIG. 5) so as to correspond to the central portions of the pixels 27 arranged in a predetermined pattern (every three pixels in FIG. 5) in the plurality of pixels 27 in these rows, and the plurality of touch input contact points 16a are substantially evenly dispersed and arranged in such a manner that they do not overlap the plurality of spherical spacers 21. It is to be noted that FIG. 5 shows the example where one spherical spacer 21 is provided in accordance with the plurality of pixels 27, but the plurality of spherical spacers 21 are dispersed in one pixel 27 in practice.

The liquid crystal display device 1 sequentially turns on the plurality of TFTs 5, supplies an image data signal to each of the plurality of pixel electrodes 4, writes image data by applying a voltage corresponding to the image data signal to the space between the plurality of pixel electrodes 4 and the opposed electrode 16, thereby displaying an image corresponding to the image data signal.

Furthermore, the liquid crystal display device 1 has a touch panel function for touch input. When an arbitrary position in the screen area 1a of this liquid crystal display device 1 is touched by, e.g., a fingertip or a touch pen from the observation side, the front substrate 2 bends and deforms in a region between the plurality of spherical spacers 21 and 21 around the touch position by the pressing force of the touch from the outer surface side, and the touch input contact point 16a in a portion where the front substrate 2 bends and deforms in the plurality of touch input contact points 16a provided on the opposed electrode 16 on the inner surface of the front substrate 2 partially comes into contact with the pixel electrode 4 facing the touch input contact point 16a in the plurality of the pixel electrodes 4 on the inner surface of the rear substrate 3.

When the touch input contact point 16a comes into contact with the pixel electrode 4, a potential of this pixel electrodes 4 becomes equal to a potential of the signals applied to the opposed electrode 16. It is to be noted that the touch input contact point 16a comes into contact with the pixel electrode 4 through the aligning films 20 and 15 provided on the inner surface of the front substrate 2 and the inner surface of the rear substrate 3. Since each of the aligning films 20 and 15 is a very thin porous film having a film thickness of approximately 0.02 μm, a leak current flows through these aligning films 20 and 15, and the pixel electrode 4 is electrically connected with the opposed electrode 16.

Further, at this moment, when the TFT 5 connected with the pixel electrode 4 is turned on by applying the scanning signal, a potential of the signal line 12 connected with the pixel electrode 4 through the TFT becomes equal to the potential of the pixel electrode 4.

Therefore, sequentially turning on the TFTs 5 to detect potentials of the plurality of signal lines 12 during a period other than a period that the image data is written enables detecting touch input with respect to the liquid crystal display device 1.

The liquid crystal display apparatus according to the present invention includes the liquid crystal display device 1 and a driver causing this liquid crystal display device 1 to perform display of an image and touch input, and the driver is formed in a driver device 28 (see FIG. 1) that is connected with the plurality of scanning line terminals, the plurality of signal line terminals, and the opposed electrode terminal and mounted on the projecting portion 3a of the front substrate 2 of the liquid crystal display device 1.

The driver is configured to selectively perform image data writing of sequentially turning on the plurality of TFTs 5, supplying an image data signal from the signal line 12 to each of the plurality of pixel electrodes 4, and applying a voltage corresponding to the image data signal to the space between the pixel electrodes 4 and the opposed electrode 16 or touch input detection of sequentially turning on the TFTs 5 to detect a potential of each of the plurality of signal lines 12 during a period other than a period that the image data is written.

In the liquid crystal display apparatus according to this embodiment, the driver is configured to apply a common signal having the same potential to the opposed electrode 16 of the liquid crystal display device 1 at the time of the image data writing and the touch input detection.

The driver includes: a unit to apply the common signal to the opposed electrode 16; a unit to sequentially supply the scanning signal to the plurality of scanning lines 11 associated with the TFTs 5 in each row in accordance with each predetermined selection period; a unit to supply the image data signal to the plurality of signal lines 12 associated with the TFTs 5 in each column in accordance with each selection period for each row in synchronization with a period as a part in the selection period; and a unit to detect a potential of each of the plurality of signal lines 12 in synchronization with the other period in the selection period.

Figure 6:
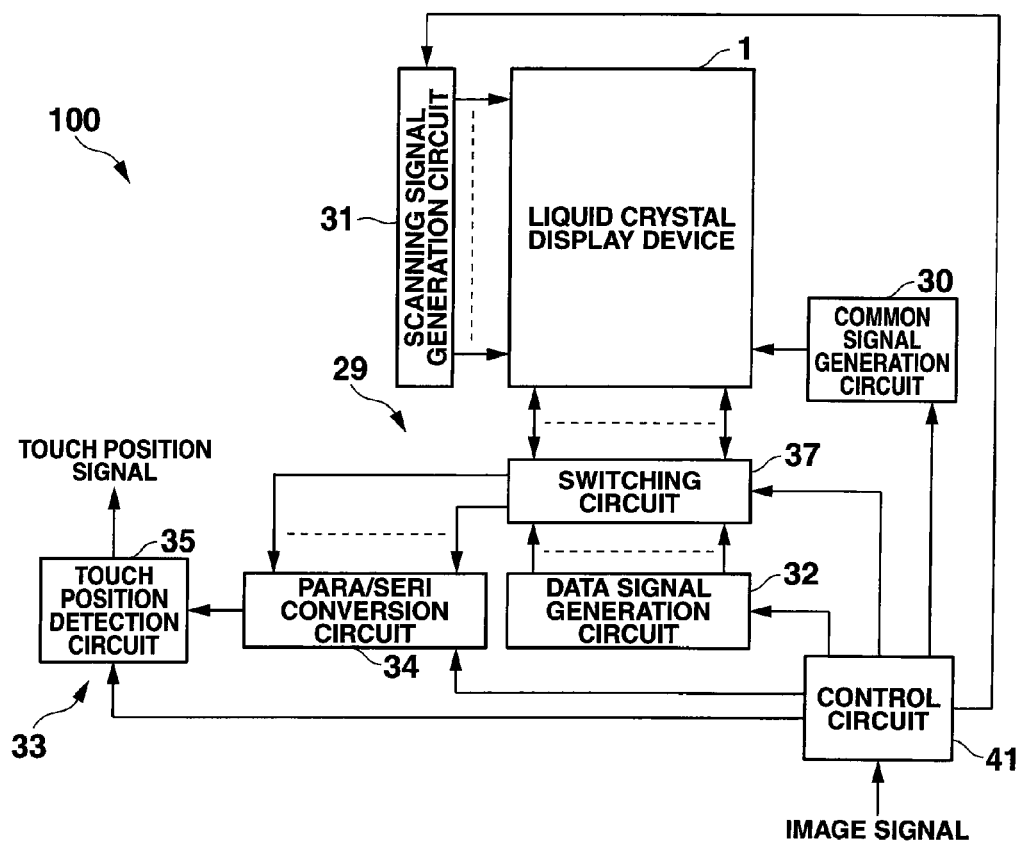
FIG. 6 is a block diagram of a driver in the liquid crystal display apparatus according to the first embodiment.

FIG. 6 is a block diagram of the driver, and this driver 29 includes: a common signal generation circuit 30 to apply the common signal to the opposed electrode 16; a scanning signal generation circuit 31 to sequentially supply the scanning signal to the plurality of scanning lines 11 in accordance with each preset selection period; a data signal generation circuit 32 to supply the image data signal to the plurality of signal lines 12 in accordance with a selection period for each row; a touch input detection unit 33 to detect a potential of each of the plurality of signal lines 12 and outputs positional data of the pixel 27 in which the touch input contact point 16a comes into contact with the pixel electrode 4 based on the potentials of the signal lines 12; a switching circuit 37 to switch connection between the data signal generation circuit 32 and the plurality of signal lines 12 synchronized with a period as a part in the selection period and connection between the touch input detection unit 33 and the plurality of signal lines 12 synchronized with the other period in the selection period in accordance with each selection period for each row; and a control circuit 41 to control them.

In this embodiment, the touch input detection unit 33 is formed of a parallel/serial data conversion circuit 34 (which will be referred to as a para/seri conversion circuit hereinafter) to convert a signal input to each of the plurality of signal lines 12 in parallel into a serial data signal corresponding to an order of the plurality of signal lines 12 and output the serial data signal as touch position information data for each row, and a touch position detection circuit 35 to output positional data of the pixel 27 in which the touch input contact point 16 comes into contact with the pixel electrode 4, i.e., coordinate data of a touch position based on the touch position information data from this para/seri conversion circuit 34.

The control circuit 41 applies the common signal to the opposed electrode 16 from the common signal generation circuit 30, sequentially applies the scanning signal to the plurality of scanning lines 11 from the scanning signal generation circuit 31, and allows the data signal generation circuit 32 to generate the image data signal corresponding to an externally supplied image signal in accordance with each preset selection period.

Further, in accordance with each selection period, during a period as a part in the selection periods, the control circuit 41 switches the switching circuit 37 to a state where the data signal generation circuit 32 is connected with the plurality of signal lines 12 and allows the data signal generation circuit 32 to output the image data signal to the plurality of signal lines 12.

Furthermore, in accordance with each selection period, during the other period in the selection periods, i.e., during a period other than a period that the image data signal is output from the data signal generation circuit 32 to the plurality of signal lines 12, the control circuit 41 switches the switching circuit 37 to a state where the touch input detection unit 33 is connected to the plurality of signal lines 12 and allows the touch input detection unit 33 to perform touch input detection.

Figure 7:
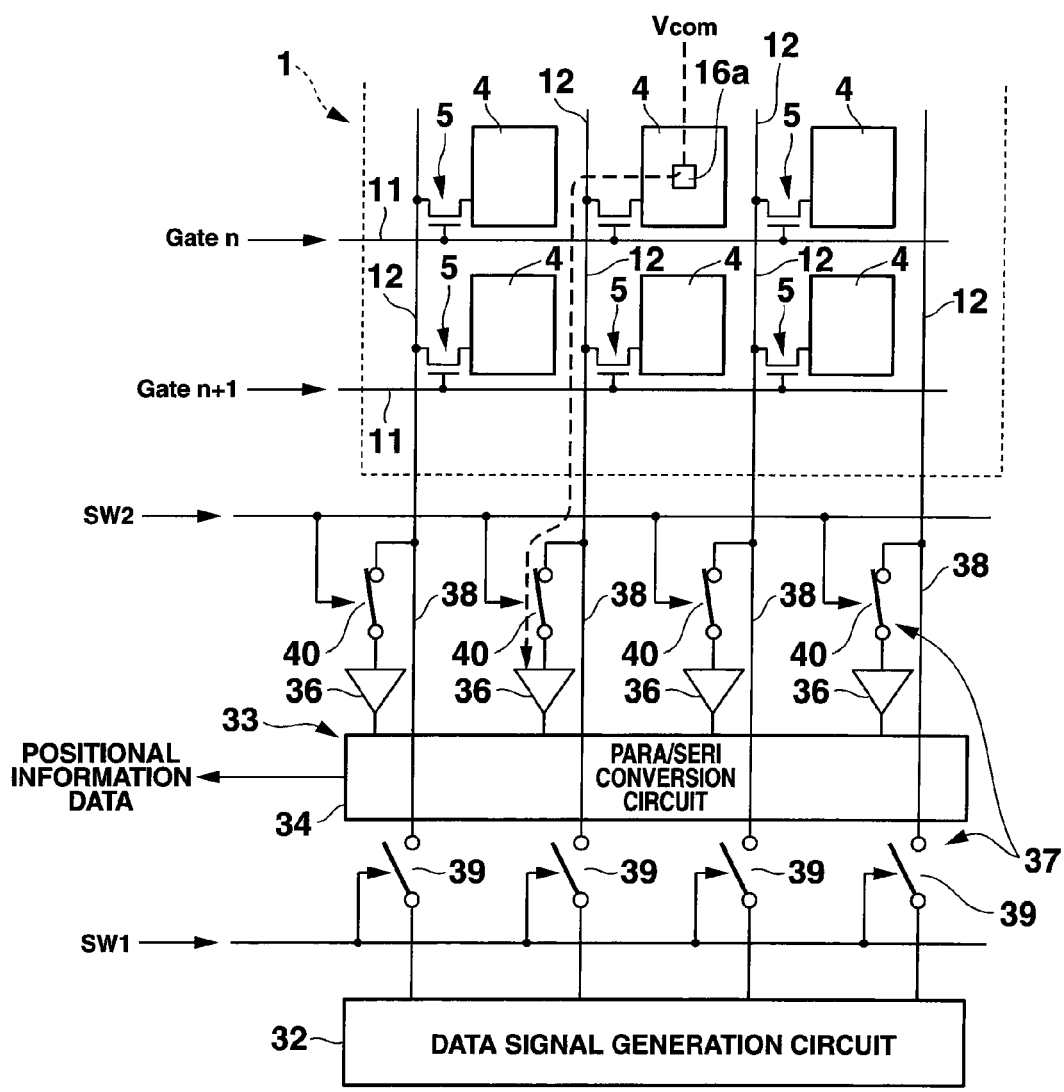
FIG. 7 is a schematic view showing a configuration of a primary part of the driver.

FIG. 7 is a schematic view showing a configuration of a primary part of the driver 29. It is to be noted that, in the liquid crystal display device 1, the plurality of pixel electrodes 4 in each column are arranged to be alternately staggered at a ½ pitch in the row direction in accordance with each neighboring row, but the plurality of pixel electrodes 4 in each column are linearly arranged.

As shown in FIG. 7, the switching circuit 37 includes a plurality of first switches 39, which lie on a plurality of signal supply lines 38 through which the plurality of pixel data signals output to the plurality of signal lines 12 from the data signal generation circuit 32 are supplied to the plurality of signal lines 12, to be turned on based on a first switching signal SW1 from the control circuit 41 and turned off by interruption of the first switching signal SW1, and a plurality of second switches 40, which lie on of the plurality of signal supply lines 38 between the liquid crystal display device 1 and the para/seri conversion circuit 34 at the liquid crystal display device side than the first switches 39, to be turned on by a second switching signal SW2 from the control circuit 41 and turned off by interruption of the second switching signal SW2.

Moreover, comparators 36 to output a digital signal having a value 0 when a signal having a potential lower than a predetermined reference potential is input and output a digital signal having a value 1 when a signal having a potential higher than the reference potential is input are located on the plurality of signal supply lines 38 between the second switches 40 and the para/seri conversion circuit 34, respectively.

Figure 8:
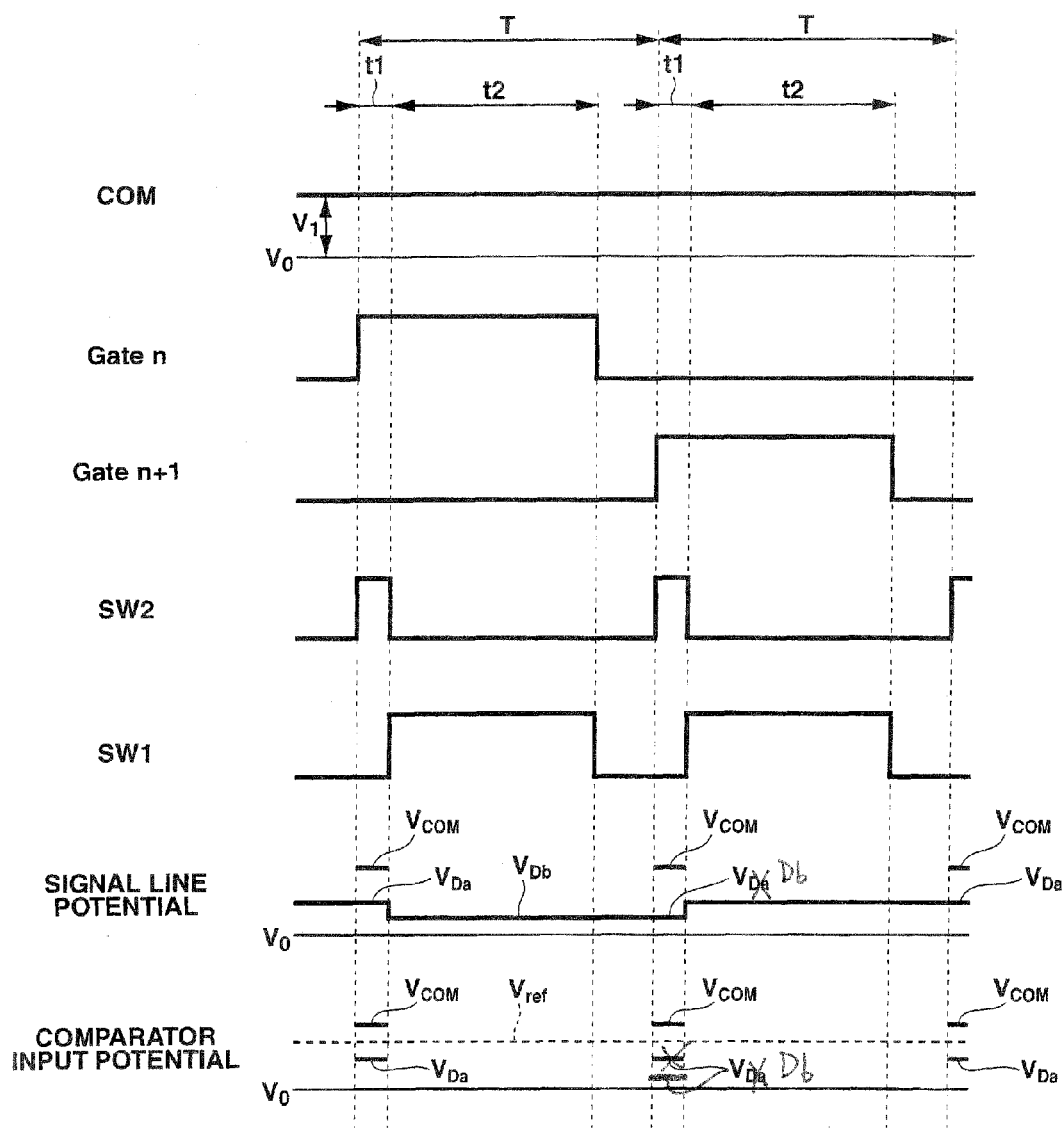
FIG. 8 is a driving sequence diagram of the liquid crystal display device by the driver.

FIG. 8 is a driving sequence diagram of the liquid crystal display device 1 by the driver 29, and it shows a driving sequence during selection periods for the pixels 27 in two adjacent rows in one frame required to display an image for one screen in this example. In the following description, it is assumed that a row that is selected first in the two rows is an nth row and a row that is selected next is an n+1th row.

In FIG. 8, T denotes a selection period of one row, and the driver 29 is configured to perform the image data writing and the touch input detection in accordance with each selection period T for each row. In this embodiment, the driver 29 is configured to perform the touch input detection on initial stages in these selection periods T and carry out the image data writing after the touch input detection in accordance with each selection period T for each row.

That is, in this embodiment, a predetermined period on the initial stage in the selection period T for each row is a touch input detection period t1 and a predetermined period after the touch input detection is an image data writing period t2.

It is to be noted that, since the touch input detection period t1 is a period during which contact/non-contact between the touch input contact point 16a and the pixel electrode 4 is detected and it does not concern behaviors of liquid crystal molecules in the liquid crystal layer 24, this period can be a time extremely shorter than the image data writing period t2.

Further, in FIG. 8, COM designates the common signal that is applied to the opposed electrode 16; Gate n, the scanning signal that is applied to the scanning line 11 in the nth row; Gate+1, the scanning signal that is applied to the scanning line 11 in the n+1th row; SW1 and SW2, the first switching signal and the second switching signal.

The common signal COM that is applied to the opposed electrode 16 is a signal having a predetermined potential difference $V_1$ with respect to the ground potential $V_0$, and a polarity of this signal is inverted with respect to the ground potential $V_0$ in accordance with each frame.

Furthermore, the image data signal applied to each of the plurality of signal lines 12 is a signal that has a polarity for the ground potential $V_0$ being opposite to that of the common signal COM and has a potential difference corresponding to image data with respect to the common signal COM, and the polarity of this signal is inverted in accordance with inversion of the polarity of the common signal COM.

As shown in FIG. 8, the driver 29 applies the common signal COM to the opposed electrode 16 in the liquid crystal display device 1 over the entire period of one frame, and it applies the scanning signal Gate n or Gate n+1 that turns on the TFT 5 to the scanning line 11 in a selected row in accordance with the selection period T for each row.

Moreover, the driver 29 connects the plurality of comparators 36 interposed between the para/seri conversion circuit 34 and the second switches 40 in accordance with each of the plurality of signal supply lines 38 to the plurality of signal lines 12 during the touch input detection period t1 on the initial stage of the period that the scanning signal in the selection period T is applied and connects the data signal generation circuit 32 to the plurality of signal lines 12 during the image data writing period t2 after the touch input detection period t1 based on ON/OFF switching of the plurality of first switches 39 and the plurality of second switches 40 of the switching circuit 37 in accordance with each selection period T of each row.

Giving a description on driving the liquid crystal display device 1 by the driver 29, this driver 29 repeats the following driving in accordance with each selection period T of each row.

First, during the touch input detection period t1 on the initial stage of the selection period T, the plurality of second switches 40 of the switching circuit 37 are turned on, and the plurality of comparators 36 are connected to the plurality of signal lines 12, respectively. At this time, the plurality of first switches 39 of the switching circuit 37 are in the OFF state, and hence the data signal generation circuit 32 is interrupted with respect to the plurality of signal lines 12.

Therefore, during the touch input detection period t1, a potential of the pixel electrode 4 of the pixel 27 in a selected row among the plurality of pixels 27 in each column is input to the comparator 36 through the TFT 5 that is turned on by application of the scanning line and the signal line 12 connected with this TFT 5 in accordance with each of the pixel columns corresponding to each of the plurality of signal lines 12.

On the other hand, the plurality of pixels 27 include pixels having no touch input contact points 16*a* provided thereto (which will be referred to as non-contact point pixels hereinafter) and pixels having the touch input contact points 16*a* provided thereto (which will be referred to as contact point pixels hereinafter), and a potential of the pixel electrode 4 in the non-contact point pixel during the touch input detection period t1 has a value corresponding to image data written in a previous frame.

Further, a potential of the pixel electrode 4 in the contact point pixel during the touch input detection period t1 has a value corresponding to image data written in the pervious frame when the touch input contact point 16*a* does not come into contact with the pixel electrode 4, and it has the same value as a potential of the common signal COM produced by application of a potential of the pixel electrode 4 in the contact point pixel to the opposed electrode 16 when the touch input contact point 16*a* comes into contact with the pixel electrode 4.

Furthermore, a potential of each of the pixel electrodes 4 in the contact point pixel and the non-contact point pixel has a value corresponding to image data written in a current frame during the image data writing period t2 after the touch input detection period t1.

Therefore, as shown in FIG. 8, a potential in each of the plurality of signal lines 12 connected with the plurality of pixel electrodes 4 in each column through the TFTs 5 becomes either a potential (which will be referred to as a previous frame write potential hereinafter) $V_D a$ corresponding to image data written in the previous frame with respect to the pixel electrode 4 in the pixel 27 in a selected line or a potential (which will be referred to as a common potential hereinafter) $V_{COM}$ having the same value as the common signal COM applied to the opposed electrode 16 during the touch input detection period t1, and it becomes a potential (which will be referred to as a current frame write potential hereinafter) $V_D b$ corresponding to image data written in the current frame during the image data write period t2 after the touch input detection period t1.

It is to be noted that both the previous frame write potential $V_D a$ and the current frame write potential $V_D b$ are potentials each having a value corresponding to a gray-level value specified by the image data in a plurality of luminance gray levels, and the potential $V_D a$ and the potential $V_D b$ are potentials each having an absolute value sufficiently smaller than an absolute value of the common potential $V_{COM}$.

Therefore, the potential input to each of the plurality of comparators 36 during the touch input detection period t1 is either the previous frame write potential $V_D a$ or the common potential $V_{COM}$ as shown in FIG. 8.

Moreover, each of the plurality of comparators 36 outputs a digital signal having a value 0 when a signal having a potential lower than a reference potential $V_{ref}$ is input and outputs a digital signal having a value 1 when a signal having a potential higher than the reference potential $V_{ref}$ is input.

The reference potential $V_{ref}$ for these comparators 36 are set to a value that has a polarity for the ground potential $V_0$ being equal to one of polarities of the common signal COM whose polarity is inverted in accordance with each frame and has an absolute value being set to a value that is higher than the highest potential in the potentials (the previous frame write potential $V_D a$ and the current frame write potential $V_D b$) corresponding to the image data and smaller than the absolute value of the common potential $V_{COM}$.

That is, each of the plurality of comparators 36 outputs a digital signal having a value 0 (which will be referred to as a non-touch signal hereinafter) to the para/seri conversion circuit 34 when the previous frame write potential $V_D a$ as a signal having a potential lower than the reference potential $V_{ref}$ is input, and it outputs a digital signal having a value 1 (which will be referred to as a touch signal hereinafter) to the para/seri conversion circuit 34 when the common potential $V_{COM}$ as a signal having a potential higher than the reference potential $V_{ref}$ is input.

For example, when the touch input contact point 16*a* comes into contact with the pixel electrode 4 in one contact point pixel in the plurality of pixels in an nth row during a selection period for this row in FIG. 7, the common potential $V_{COM}$ is input to the comparator 36 connected with the signal line 12 corresponding to a pixel column including the contact point pixel in which the touch input contact point 16*a* has come into contact with the pixel electrode 4 through a path indicated by a dotted line in FIG. 7, the touch signal is output to the para/seri conversion circuit 34 from the comparator 36 to which the common potential $V_{COM}$ has been input in the plurality of comparators 36, and the non-touch signal is output to the para/seri conversion circuit 34 from each of the other comparators 36.

It is to be noted that the respective pixel rows in the liquid crystal display device 1 include rows that include the contact point pixels and rows that do not include the contact point pixels, the non-touch signal is output to the para/seri conversion circuit 34 from all the comparators 36 during the selection period for each row including no contact point pixel, and the non-touch signal is output to the para/seri conversion circuit 34 from all the comparators 36 when the touch input contact points 16*a* in all the contact point pixels in each row including the contact point pixels do not come into contact with the pixel electrodes 4 even during the selection period for this row.

The para/seri conversion circuit 34 converts the signal output from each of the plurality of comparators 36 in parallel in accordance with each selection period T for each row into a serial data signal corresponding to the order of the plurality of signal lines 12, and outputs this serial data signal as touch position information data of a selected row to the touch position detection circuit 35.

Then, when the touch input detection period t1 has passed, the plurality of second switches 40 of the switching circuit 37 are turned off to disconnect the plurality of comparators 36 and the para/seri conversion circuit 34 from the plurality of signal lines 12 and, at the same time, the plurality of first switches 39 of the switching circuit 37 are turned on to connect the data signal generation circuit 32 to each of the plurality of signal lines 12, and then the image data signal for one row is output from the data signal generation circuit 32.

That is, during the image data write period t2 after the touch input detection period t1, the data signal generation circuit 32 is connected to each of the plurality of signal lines 12, the image data signal for one row is output from the data signal generation circuit 32, and the image data signal is applied to each of the plurality of signal lines 12.

The image data signal applied to each of the plurality of signal lines 12 is applied to the plurality of pixel electrodes 4 in a selected row through the respective TFTs 5, thereby writing image data into the plurality of pixels 27 in the selected row.

Thereafter, the above-described driving is repeated, and the driver 29 performs detection of touch input by the touch input detection unit 33 including the para/seri conversion circuit 34 and the touch position detection circuit 35 and image data writing that the image data signal from the data signal generation circuit 32 is applied to each of the plurality of pixel electrodes 4 in accordance with each selection period T for each row in one frame.

Further, the touch position detection circuit 35 detects a coordinate of a touch position in two axial directions, i.e., an X axis direction (e.g., the row direction) and a Y axis direction (e.g., the column direction) in accordance with each frame based on touch position information data of each row output from the para/seri conversion circuit 34, and outputs a touch position signal corresponding to the X and Y axis coordinate.

However, in this embodiment, a polarity of the reference potential $V_{ref}$ for the plurality of comparators 36 with respect to the ground potential $V_0$ is set to be equal to one of polarities of the common signal COM whose polarity is inverted in accordance with each frame. Touch input detection performed by the touch input detection unit 33 every other frame in which the common signal COM having the polarity opposite that of the reference potential $V_{ref}$ is applied to the opposed electrode 16 in the respective frames is paused. Touch input detection by the touch input detection unit 33 is carried out every other remaining frames, i.e., each frame in which the common signal COM having the same polarity as that of the reference potential $V_{ref}$ is applied to the opposed electrode 16.

Therefore, although the X and Y axis coordinate of the touch position detected by the touch position detection circuit 35 is a coordinate detected based on the touch position information data of each row output to the touch position detection circuit 35 from the para/seri conversion circuit 34 every other frame, a touch time for the liquid crystal display device 1 is short but it is a time corresponding to several frames or more, and hence the coordinate of the touch position can be sufficiently detected.

It is to be noted that the reference potential $V_{ref}$ for the plurality of comparators 36 may be set to a value that has a polarity for the ground potential $V_0$ being inverted in response to inversion of the polarity of the common signal COM in accordance with each frame and an absolute value in each polarity being larger than a potential having the highest absolute value in potentials corresponding to the image data (the previous frame write potential $V_D a$ and the current frame write potential $V_D b$) and smaller than an absolute value of the common potential $V_{COM}$. Setting the reference potential in this manner enables performing touch input detection by the touch input detection unit 33 in accordance with each of all frames and highly accurately effecting detection of a coordinate of a touch position by the touch position detection circuit.

The liquid crystal display apparatus includes the liquid crystal display device 1 and the driver 29 for selectively performing image data writing that the plurality of TFTs 5 of the liquid crystal display device 1 are sequentially turned on and the image data signal is supplied to each of the plurality of pixel electrodes 4 from each signal line 12 to apply a voltage corresponding to the image data signal to a space between these pixel electrodes 4 and the opposed electrode 16 and touch input detection that the TFTs 5 are sequentially turned on to detect a potential of each of the plurality of signal lines 12 during a period other than a period that the image data is written. Therefore, an image can be displayed in the liquid crystal display device 1, and touch input with respect to the liquid crystal display device 1 can be detected.

Accordingly, in the liquid crystal display apparatus, a plurality of key patterns can be displayed in the liquid crystal display device 1, an enlarged image can be displayed in the liquid crystal display device 1 with a touch portion at the center based on keyboard-like touch input that portions corresponding to the plurality of key patterns are selectively touched as well as touch of an arbitrary portion of an image displayed in the liquid crystal display device 1, or a display image in the liquid crystal display device 1 can be scrolled by moving a touch point in an arbitrary direction on the liquid crystal display device 1.

Moreover, in the liquid crystal display apparatus according to the embodiment, since the common signal COM having the same potential $V_{COM}$ is applied to the opposed electrode 16 of the liquid crystal display device 1 from the driver 29 at the time of the image data writing and the touch input detection, application of the signal to the opposed electrode 16 can be performed by the single common signal generation circuit 30 even though the liquid crystal display device 1 carries out the display of an image and the touch input detection.

Additionally, according to the embodiment, the driver 29 is formed of the unit to apply the common signal to the opposed electrode 16, the unit to sequentially supply the scanning signal to each of the plurality of scanning signals 11 associated with each TFT 5 in each row in accordance with a predetermined selection period T, the unit to apply the image data signal to each of the plurality of signal lines 12 associated with each TFT 5 in each column for each selection period T for each row in synchronization with the period t2 as a part in the selection period T, and the unit to detect a potential of each of the plurality of signal lines 12 in synchronization with the other period t1 in the selection period T, thereby assuredly performing the image data writing and the touch input detection.

Further, according to the embodiment, the driver 29 includes the common signal generation circuit 30 to apply the common signal to the opposed electrode 16, the scanning signal generation circuit 31 to sequentially supply the scanning signal to each of the plurality of scanning signals 11 in accordance with each predetermined period T, the data signal generation circuit 32 to supply the image data signal to each of the plurality signal lines 12 in accordance with each selection period T for each row, the touch input detection unit 33 to detect a potential of each of the plurality of signal lines 12 and outputs positional data of the pixel 27 in which the touch input contact point 16a has come into contact with the pixel electrode 4 based on the potential of each of these signal lines 12, the switching circuit 37 to switch connection between the data signal generation circuit 32 and the plurality of signal lines 12 synchronized with the period t2 as a part in the selection period T and connection between the touch input detection unit 33 and the plurality of signal lines 12 synchronized with the other period t1 in the selection period T in accordance with each selection period T for each row, and the control circuit 41 to control them, thereby further assuredly performing the image data writing and the touch input detection.

Furthermore, in the liquid crystal display apparatus according to the foregoing embodiment, since the driver 29 is configured to perform the image data writing and the touch input detection in accordance with each selection period T for each row, thereby displaying a high-quality image in the liquid crystal display device 1 without flickering.

Moreover, according to the foregoing embodiment, since the driver 29 is configured to perform the touch input detection during the period t1 on the initial stage in the selection period T and carry out the image data writing during the period t2 after the touch input detection in accordance with each selection period T for each row, the touch input with respect to the liquid crystal display device 1 can be detected without affecting display of an image.

Additionally, in the liquid crystal display device 1 according to the foregoing embodiment, the plurality of touch input contact points 16a that come into contact with the pixel electrodes 4 by flexural deformation caused by a pressing force of a touch onto the substrate 2 from the outer surface side are provided to the opposed electrode 16 to protrude at a height smaller than the gap between the pair of substrates 2 and 3, and contact/non-contact of the touch input contact points 16a and the pixel electrodes 4 is detected based on application of the signal to the opposed electrode 16, sequential supply of the scanning signal to each of the plurality of scanning lines 11, and detection of a potential of each of the plurality of signal lines 12. Therefore, the liquid crystal display device 1 can be manufactured by just adding a step of providing the plurality of touch input contact points 16a to a manufacturing process of a regular active matrix liquid crystal display device having no touch panel function. Therefore, as compared with the conventional liquid crystal display device having the touch panel function disclosed in Jpn. Pat. Appln. KOKAI Publication No. 2007-58070, the liquid crystal display device can be manufactured at a low cost with the reduced number of steps.

Additionally, in the liquid crystal display device 1, since the plurality of touch input contact points 16a are formed of the plurality of protrusions 19 provided on the inner surface of the front substrate 2 having the opposed electrode 16 provided thereon in the plurality of substrates 2 and 3 and the portion of the protrusions 19 of the opposed electrode 16 that is formed to cover the plurality of protrusions 19, the opposed electrode 16 and the touch input contact points 16a can be integrally formed.

Second Embodiment

Figure 9:
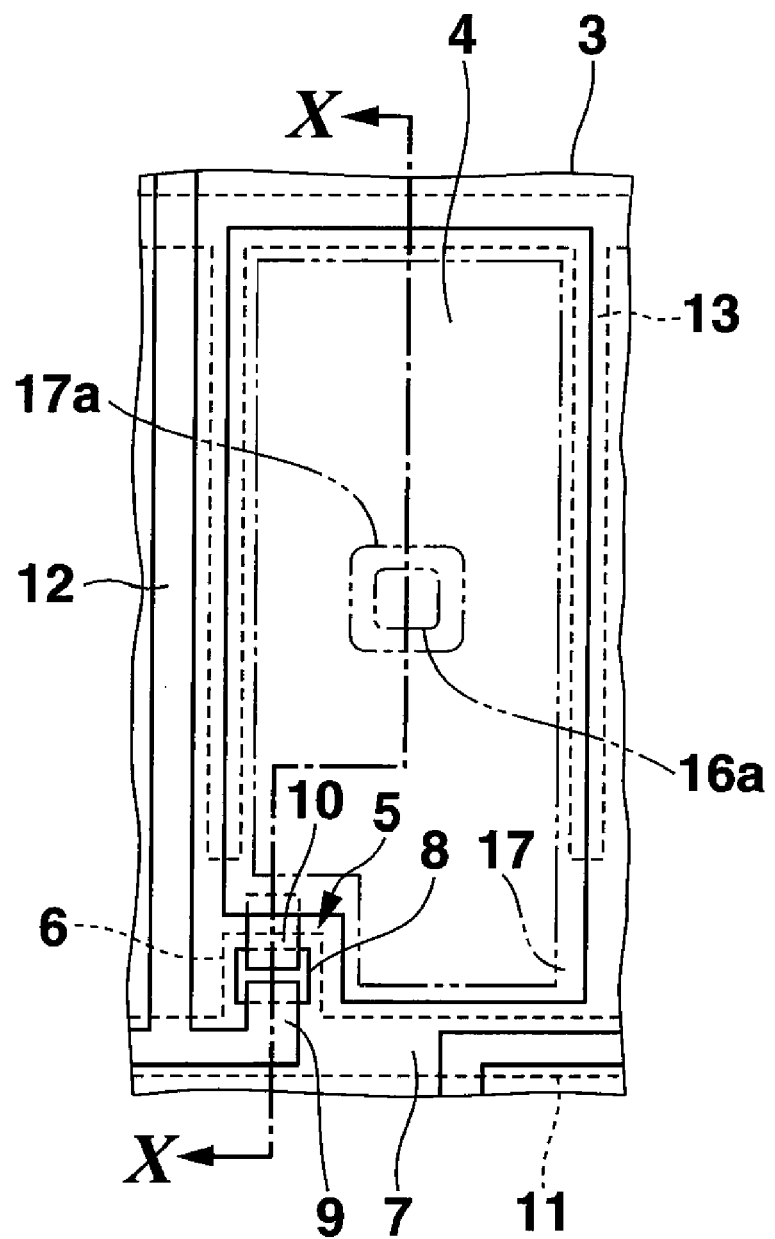
FIG. 9 is a plan view of one pixel unit on one substrate of a liquid crystal display device showing a second embodiment according to the present invention.
Figure 10:
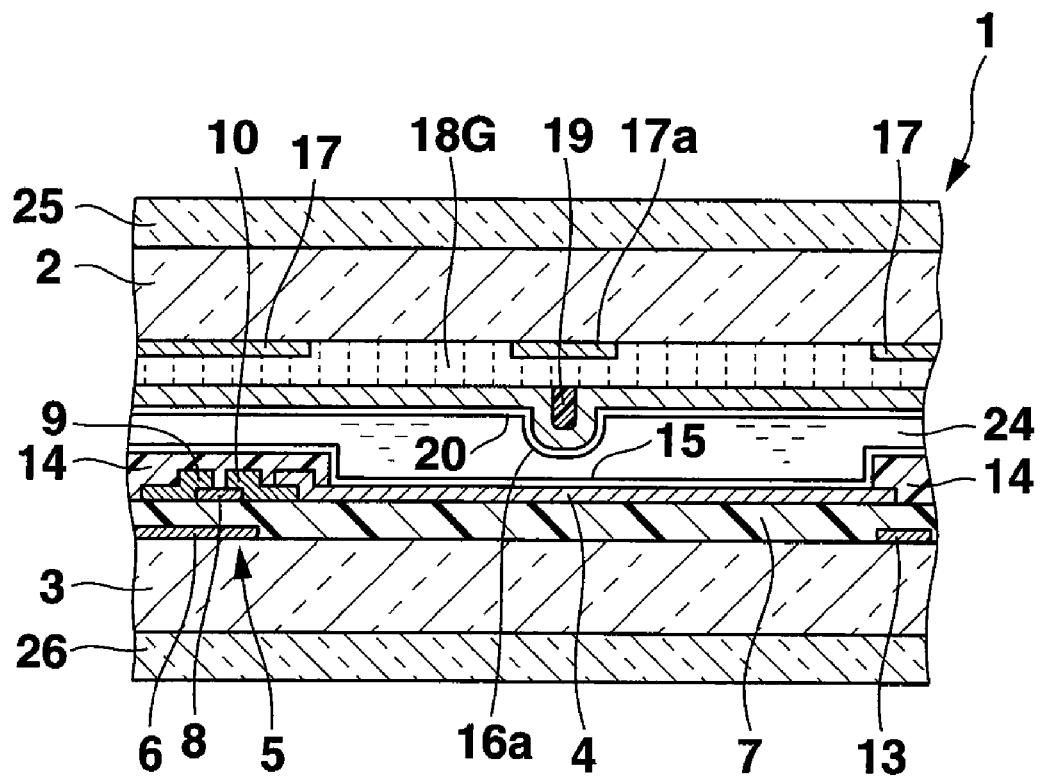
FIG. 10 is a cross-sectional view of the liquid crystal display device according to the second embodiment taken along a line X-X in FIG. 8.

FIGS. 9 and 10 show a second embodiment of the present invention, and FIG. 9 is a plan view of one pixel unit of one substrate in a liquid crystal display device, and FIG. 10 is a cross-sectional view of the liquid crystal display device taken along a line X-X in FIG. 9. It is to be noted that, in this embodiment, like reference numerals denote corresponding parts in the first embodiment and a description of the same parts will be omitted.

A liquid crystal display device 1 according to this embodiment has a configuration that a light shielding film 17a corresponding to each of the plurality of touch input contact points 16a is provided in addition to the light shielding film 17 corresponding to the region between the plurality of pixels 27 on the inner surface of the front substrate 2 in the liquid crystal display device according to the first embodiment, and other structures are the same as those in the liquid crystal display devices according to the first embodiment.

In this liquid crystal display device, since the light shielding film 17a corresponding to each of the touch input contact points 16 is provided on the inner surface of the substrate 2, the plurality of touch input contact points 16a cannot be seen from the observation side, thereby enhancing a display quality.

Third Embodiment

Figure 11:
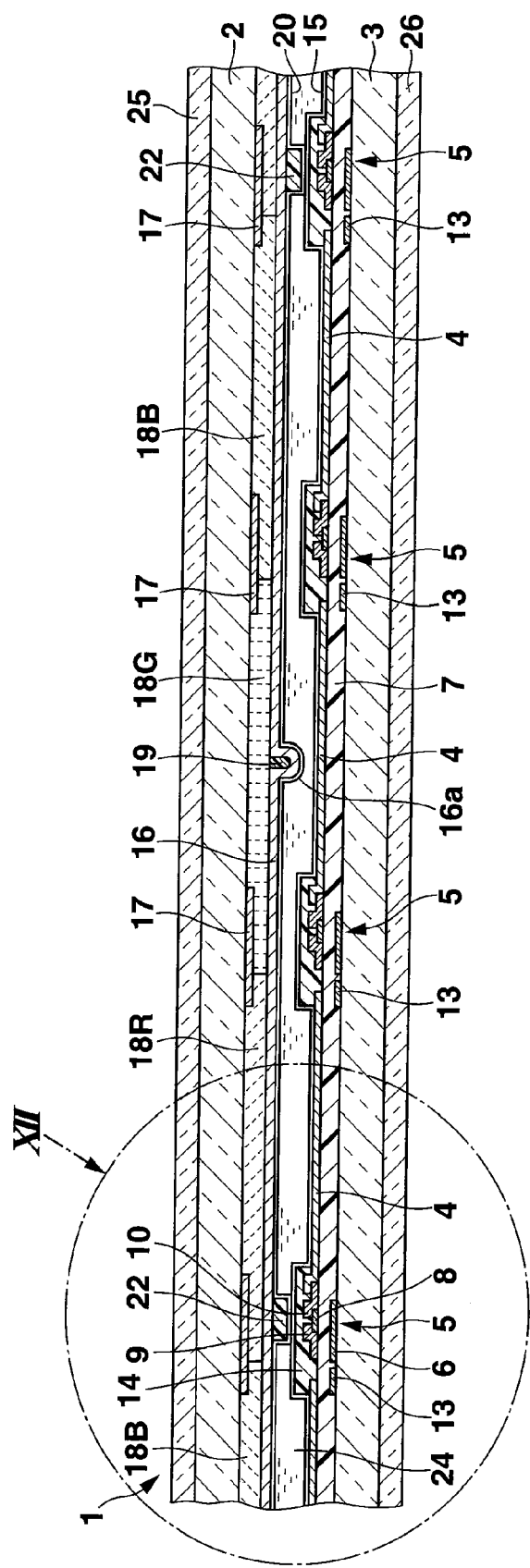
FIG. 11 is a cross-sectional view of a part of a liquid crystal display device showing a third embodiment according to the present invention.
Figure 12:
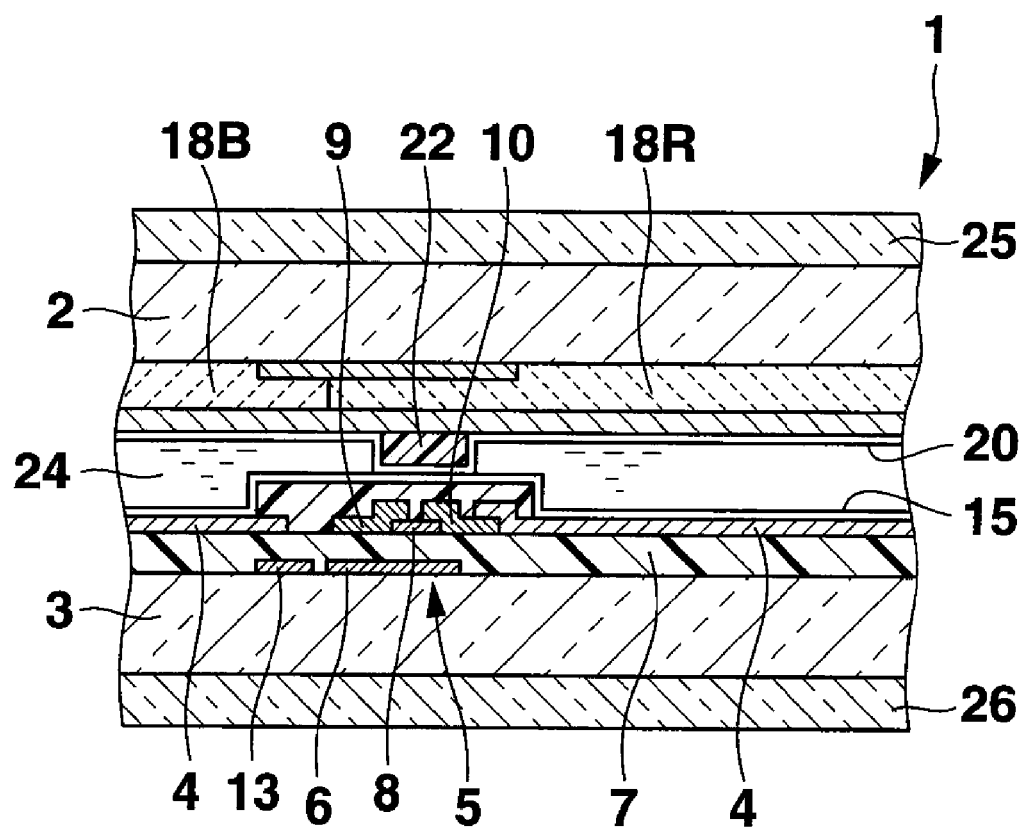
FIG. 12 is an enlarged view of a part XII in FIG. 10.
Figure 13:
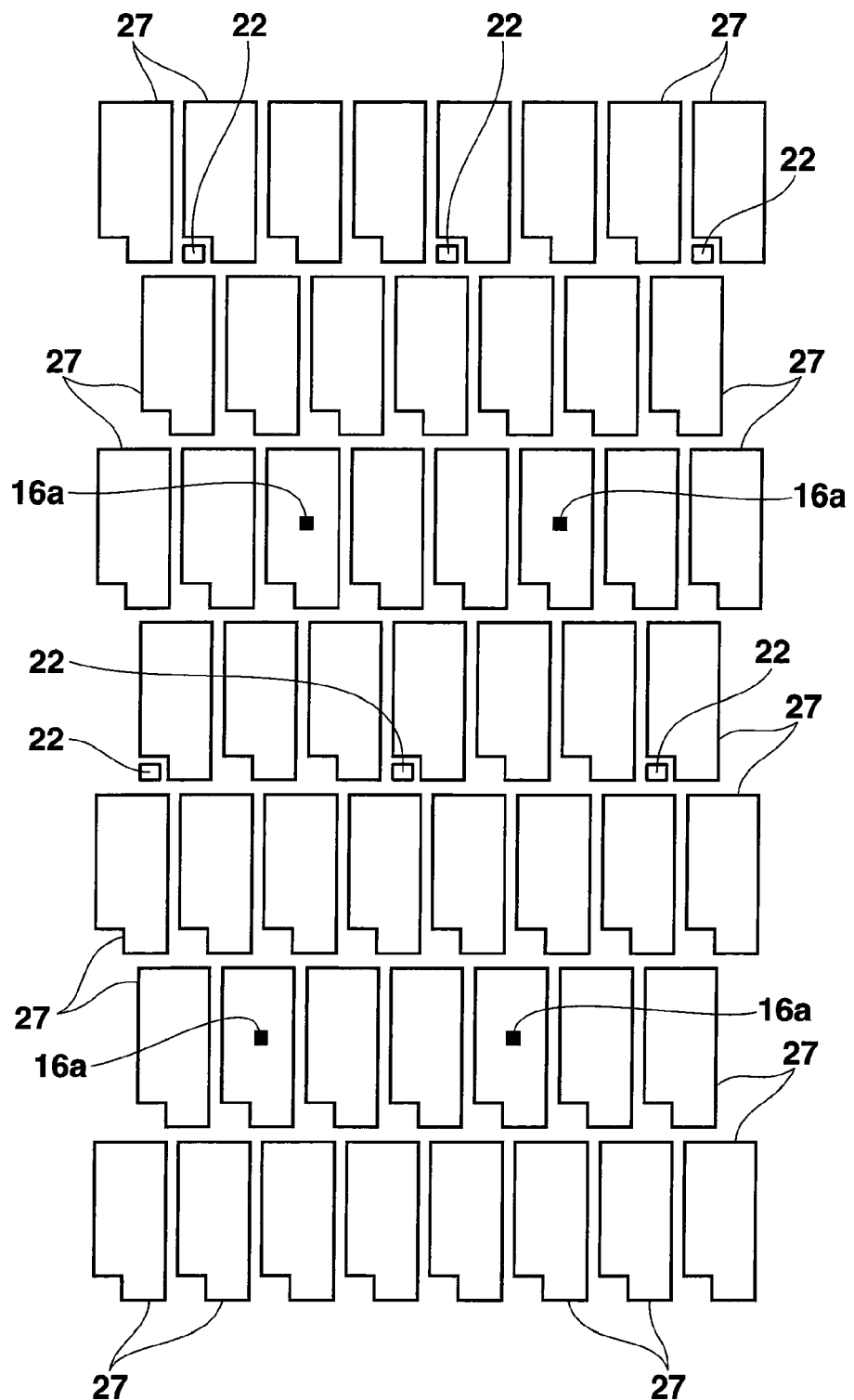
FIG. 13 is a view showing an arrangement example of a plurality of touch input contact points and spacers of the liquid crystal display device according to the third embodiment.

FIGS. 11 to 13 show a third embodiment according to the present invention. FIG. 11 is a cross-sectional view showing a part of a liquid crystal display device, FIG. 12 is an enlarged view of a part XII in FIG. 10, and FIG. 13 is a view showing an arrangement example of a plurality of touch input contact points and spacers of the liquid crystal display device 1. It is to be noted that like reference numerals denote parts corresponding to those in the first embodiment and a description of like parts will be omitted.

The liquid crystal display device 1 according to this embodiment has a configuration that a plurality of columnar spacers 22 are provided in place of the plurality of spherical spacers 21 in the liquid crystal display device according to the first embodiment, and other structures are the same as those in the liquid crystal display device according to the first embodiment.

The plurality of columnar spacers 22 are provided at a predetermined pitch so as to correspond to the region between the plurality of pixels 27 on an inner surface of one of pair of substrates 2 and 3, e.g., a front substrate 2. The plurality of columnar spacers 22 come into contact with an inner surface of the other substrate (a rear substrate) 3 to define a gap between the pair of substrates 2 and 3 to have a value larger than a protrusion height of a plurality of touch input contact points 16a.

In this embodiment, the plurality of columnar spacers 22 are formed of, e.g., a light curing resin to correspond to respective TFTs 5 at a plurality of predetermined positions among the plurality of TFTs 5 arranged so as to correspond to a plurality of pixel electrodes 4. The columnar spacers 22 are formed on the opposed electrode 16 of the front substrate 2, and an aligning film 20 is formed on the inner surface of the front substrate 2 to cover the plurality of columnar spacers 22.

In this liquid crystal display device 1, since the gap between the pair of substrates 2 and 3 is defined by the plurality of columnar spacers 22 provided so as to correspond to the region between the plurality of pixels 27, a positional relationship between the plurality of touch input contact points 16a and the plurality of columnar spacers 22 can be set in such a manner that each touch input contact point 16a can be placed in a region between the plurality of columnar spacers 22, i.e., a substantially central part of a region that the front substrate 2 bends and deforms due to pressing force of touch from the outer surface side, thereby more assuredly effecting touch input with respect to the liquid crystal display device 1.

Fourth Embodiment

Figure 14:
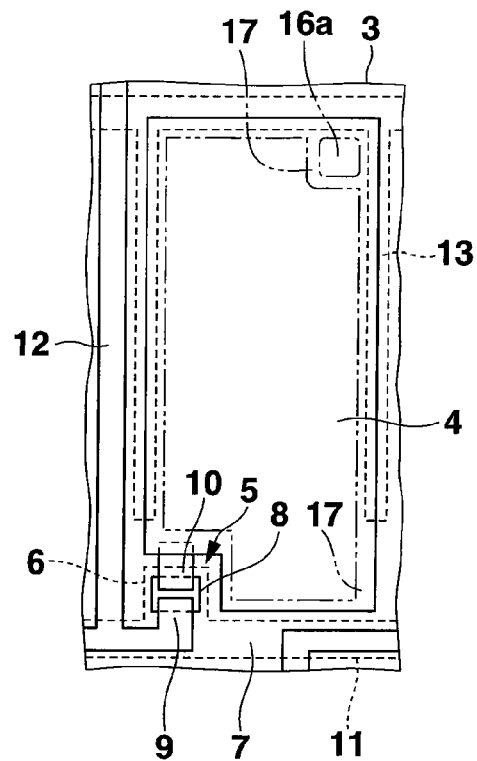
FIG. 14 is a plan view of one pixel unit on one substrate of a liquid crystal display device showing a fourth embodiment according to the present invention.

FIG. 14 is a plan view of one pixel unit on one substrate of a liquid crystal display device showing a fourth embodiment according to the present invention. It is to be noted that, in this embodiment, like reference numerals denote parts corresponding to those in the first to third embodiments and a description of like parts will be omitted.

A liquid crystal display device 1 according to this embodiment has a configuration that a touch input contact point 16a provided so as to correspond to a central part of each pixel 27 in the first to third embodiments is provided at a peripheral portion of the pixel 27, e.g., a portion corresponding to one of two corner portions on an opposite side of a side on which a TFT 5 of each pixel electrode 4 is connected and a light shielding film 17 provided so as to correspond to a region between the plurality of pixels 27 on an inner surface of a front substrate 2 is formed into a shape that covers a position near an arrangement portion of each touch input contact point 16a so as to correspond to the touch input contact point 16a, and other structures are the same as those in one of the first to third embodiments.

According to this liquid crystal display device 1, since the touch input contact point 16a is provided so as to correspond to the peripheral portion of the pixel 27, and the touch input contact point 16a or the light shielding film 17a provided on the inner surface of the front substrate 2 so as to correspond to the touch input contact point 16a cannot be seen at the central portion of the pixel 27 as different from the liquid crystal display devices according to the first to third embodiments, thus obtaining a high display quality.

Fifth Embodiment

Figure 15:
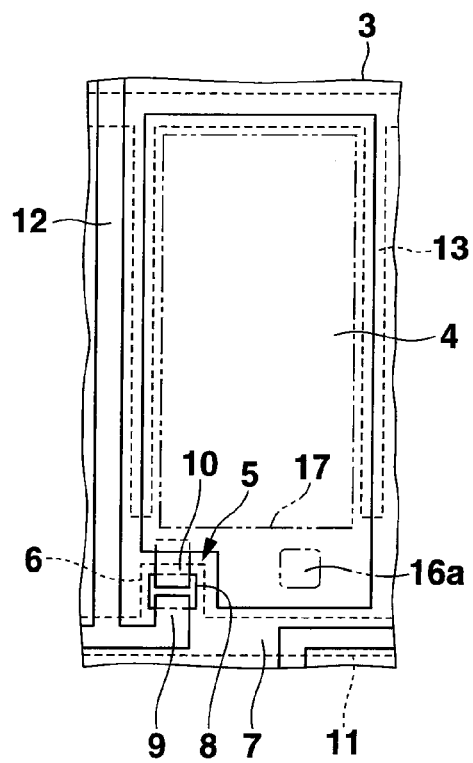
FIG. 15 is a plan view of one pixel unit on one substrate of the liquid crystal display device showing the fourth embodiment according to the present invention.

FIG. 15 is a plan view of one pixel unit on one substrate of a liquid crystal display device showing a fifth embodiment of the present invention. It is to be noted that, in this embodiment, like reference numerals denote parts corresponding to those in the first to third embodiments and a description of like parts will be omitted.

A liquid crystal display device 1 according to this embodiment has a configuration that a touch input contact point 16a provided so as to correspond to a central portion of each pixel 27 in the first to third embodiment is provided at a portion corresponding to an edge portion on a side where a TFT 5 is arranged in a peripheral portion of the pixel 27 and a light shielding film 17 provided so as to correspond to a region between the plurality of pixels 27 on an inner surface of a front substrate 2 is formed into a shape that covers a position near an arrangement portion of the touch input contact point 16a so as to correspond to the touch input contact point 16a, and other structures are the same as those in one of the first to third embodiments.

According to this liquid crystal display device 1, since the touch input contact point 16a is provided so as to correspond to the peripheral portion of the pixel 27, a high display quality can be obtained like the liquid crystal display device according to the fourth embodiment.

Other Embodiments

It is to be noted that the liquid crystal display device 1 according to each of the foregoing embodiments has the configuration that the plurality of pixel electrodes 4, the plurality of TFTs 5, the plurality of scanning lines 11, and the plurality of signal lines 12 are provided on the inner surface of the rear substrate 3, the opposed electrode 16 is provided on the inner surface of the front substrate 2, and the touch input contact points 16a are provided on the opposed electrode 16. Contrary, the plurality of pixel electrodes 4, the plurality of TFTs 5, the plurality of scanning lines 11, and the plurality of signal lines 12 may be provided on the inner surface of the front substrate 2, the opposed electrode 16 may be provided on the inner surface of the rear substrate 3, and the touch input contact points 16a may be provided on the opposed electrode 16.

Further, the liquid crystal display device 1 according to each of the foregoing embodiments has the configuration that the touch input contact points 16a are provided to partially correspond to the plurality of pixels 27 at a plurality of predetermined positions in the plurality of pixels 27 arranged in the matrix shape, but the touch input contact points 16a may be provided to partially correspond to all of the plurality of pixels 27 arranged in the matrix shape.

Furthermore, the liquid crystal display device 1 according to each of the foregoing embodiments has the configuration that the touch input contact points 16a are provided on the opposed electrode 16, but the touch input contact points may be provided on the plurality of pixel electrodes 4 forming the pixels 27 to partially correspond to all of the plurality of pixels 27 or the plurality of pixels 27 at the plurality of predetermined positions, respectively.

In this case, it is preferable to provide a plurality of protrusions on the inner surface of the substrate where the plurality of pixel electrodes 4 are provided in the pair of substrates 2 and 3 to partially correspond to all of the plurality of pixels 27 or the plurality of pixels 27 at a plurality of predetermined positions, respectively and form the plurality of pixel electrodes 4 on which the touch input contact points are provided to cover the plurality of protrusions, thereby forming the plurality of touch input contact points by using the plurality of protrusions and the portions of the pixel electrodes 4 that cover the plurality of protrusions. When such a configuration is adopted, the plurality of pixel electrodes 4 on which the touch input contact points are provided and the touch input contact points can be integrated with each other.

However, the touch input contact points may be formed on the opposed electrode 16 or the plurality of pixel electrodes 4 by using a conductive material different from those of the electrodes 16 and 4.

Moreover, the touch input contact points may be provided on both the plurality of pixel electrodes 4 forming the pixels 27 and the opposed electrode 16 to partially correspond to all of the plurality of pixels 27 or the plurality of pixels 27 at a plurality of predetermined positions.

In this case, one touch input contact point on the pixel electrode 4 side and the other touch input contact point on the opposed electrode 16 side may be provided to face each other so that the one contact point and the other contact point can come into contact with each other by flexural deformation of the front substrate 2. Alternatively, the one touch input contact point and the other touch input contact point may be provided at portions different from each other so that the one touch input contact point and the other touch input contact point can come into contact with the opposed electrode 16 and the pixel electrode 4 by flexural deformation of the front substrate 2.

Additionally, the liquid crystal display device 1 according to each of the foregoing embodiments has the configuration that the aligning films 20 and 15 are provided on the inner surfaces of the pair of substrates 2 and 3, respectively. However, the present invention can be applied to a liquid crystal display device that does not include the aligning films 20 and 15, e.g., a polymer-dispersed liquid crystal display device in which a polymer network liquid crystal layer is interposed in a gap between a pair of substrates.

Figure 16A:
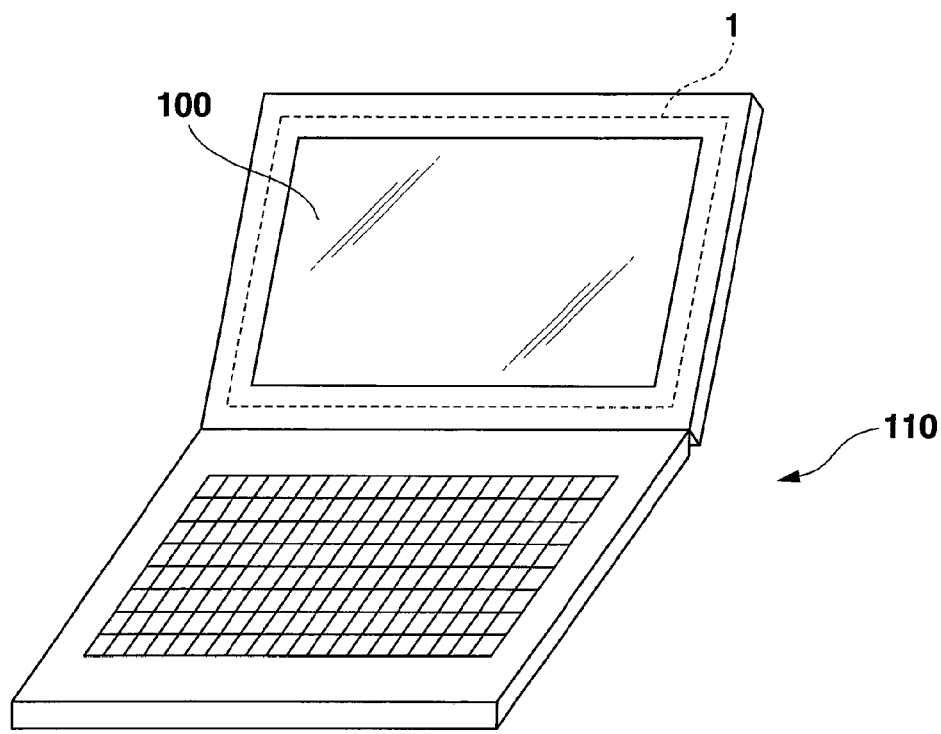
FIG. 16A is a perspective view of a notebook PC including the liquid crystal display apparatus according to the present invention.
Figure 16B:
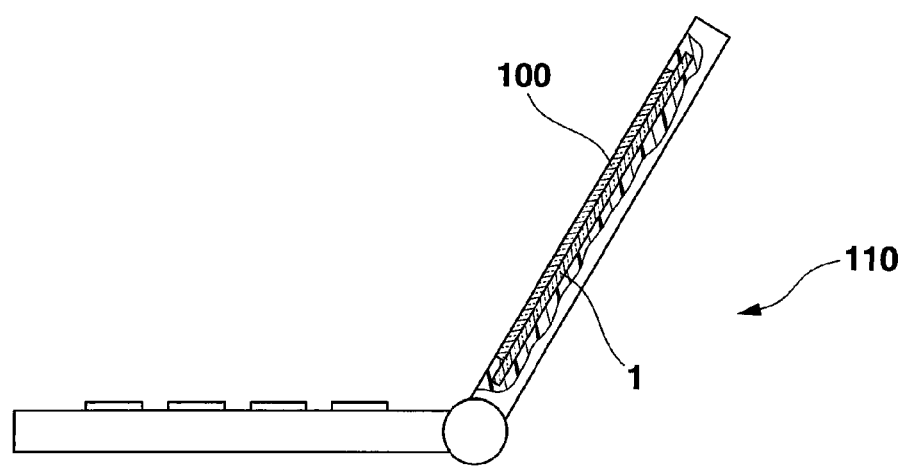
FIG. 16B is a cross-sectional view of the notebook PC including the liquid crystal display apparatus according to the present invention.
Figure 17:
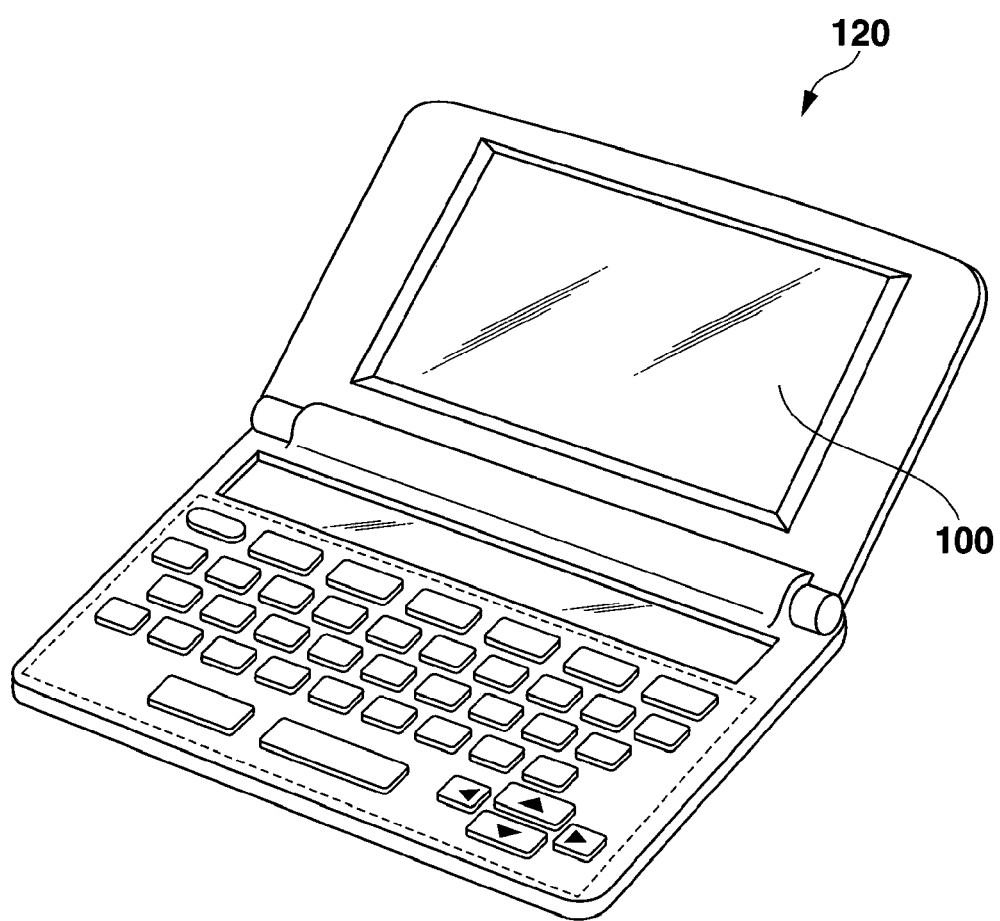
FIG. 17 is a perspective view of a PDA including the liquid crystal display apparatus according to the present invention.
Figure 18:
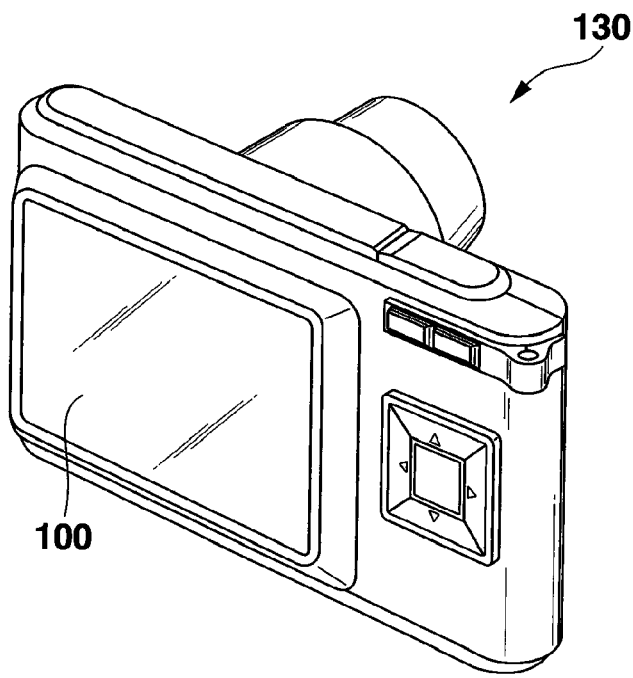
FIG. 18 is a perspective view of a digital camera including the liquid crystal display apparatus according to the present invention.
Figure 19:
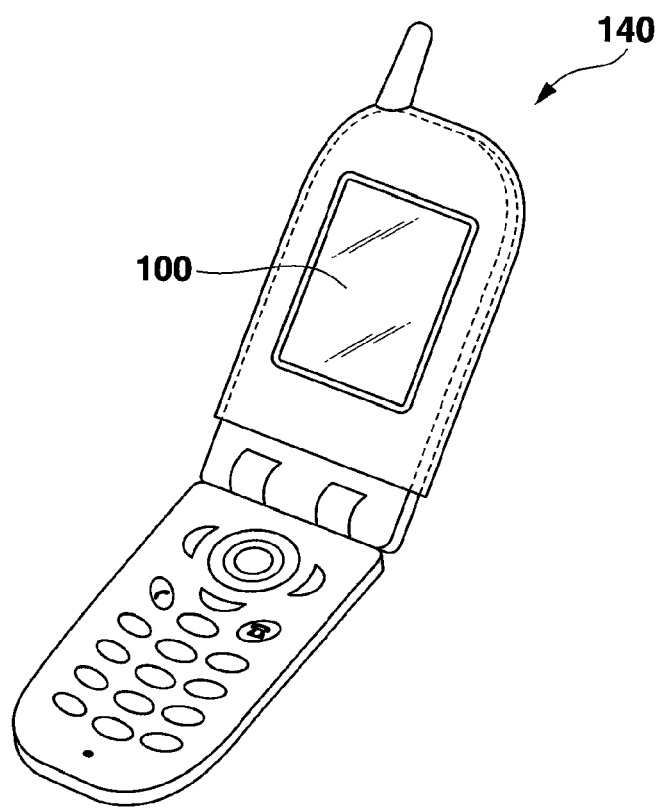
FIG. 19 is a perspective view of a mobile phone including the liquid crystal display apparatus according to the present invention.

It is to be noted that an electronic device in which a liquid crystal display apparatus 100 according to the present invention is mounted is shown. For example, FIG. 16A shows a notebook PC 110, and FIG. 16B is a cross-sectional view thereof. Further, FIG. 17 shows an example in which the liquid crystal display apparatus according to the present invention is disposed to a PDA 120, FIG. 18 shows an example in which the same is disposed to a digital camera 130, and FIG. 19 shows an example in which the same is disposed to a mobile phone 140.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A liquid crystal display device comprising:
a first substrate;
a second substrate arranged to face the first substrate with a predetermined gap between the first and second substrates;

a plurality of pixel electrodes arranged on the first substrate;
a plurality of thin-film transistors arranged on the first substrate to be respectively connected with the plurality of pixel electrodes, wherein the plurality of thin-film transistors are turned on based on a scanning signal from scanning lines which electrically connect the pixel electrodes to signal lines through which an image data signal is supplied;
an opposed electrode provided on the second substrate to face the plurality of pixel electrodes so as to form a plurality of pixels in areas facing the plurality of pixel electrodes;
a plurality of touch input contact points provided on either one of the pixel electrodes and the opposed electrode, the plurality of touch input contact points protruding at a height smaller than the predetermined gap between the first substrate and the second substrate so as to respectively correspond to at least one previously selected pixel among the plurality of pixels, wherein the plurality of touch input contact points are brought into conduction with the other one of the pixel electrodes and the opposed electrode by flexural deformation caused by a pressing force of a touch onto the first substrate or the second substrate; and
a liquid crystal layer sealed in the gap between the first substrate and the second substrate;
wherein the liquid crystal display device displays an image corresponding to the image data signal by sequentially turning on the thin-film transistors, supplying the image data signal to each of the plurality of pixel electrodes, and writing image data by applying a voltage corresponding to the image data signal between the plurality of pixel electrodes and the opposed electrode.

2. The device according to claim 1, wherein each of the plurality of touch input contact points comprises a protrusion provided on an inner surface of one of the first and second substrates, and a portion of the opposed electrode is formed so as to cover the protrusion.

3. The device according to claim 1, wherein the touch input contact points are arranged to correspond to a central portion of respective ones of the plurality of pixels.

4. The device according to claim 1, wherein the touch input contact points are arranged at a peripheral portion of respective ones of the plurality of pixels.

5. The device according to claim 1, further comprising a plurality of spherical spacers dispersed between the first and second substrates, the plurality of spherical spacers being held between the first and second substrates to define the predetermined gap between the first and second substrates to have a value larger than the protrusion height of the touch input contact point.

6. The device according to claim 1, further comprising a plurality of columnar spacers provided on the first substrate or the second substrate, the plurality of columnar spacers being arranged to correspond to a region between adjacent pixels to define the predetermined gap between the first and second substrates to have a value larger than the protrusion height of the touch input contact point.

7. The device according to claim 1, further comprising a light shielding film provided on an inner surface of one of the first and second substrates which is disposed on a display side to correspond to a region between adjacent pixels and the touch input contact points.

8. A liquid crystal display apparatus comprising:
a liquid crystal display device including:
a first substrate;
a second substrate arranged to face the first substrate with a predetermined gap between the first and second substrates;
a plurality of pixel electrodes arranged in row and column directions on the first substrate;
a plurality of thin-film transistors arranged on the first substrate to be respectively connected with the plurality of pixel electrodes, wherein the plurality of thin-film transistors are turned on based on a scanning signal from scanning lines which electrically connect the pixel electrodes to signal lines through which an image data signal is supplied, so as to supply the image data signal to the plurality of pixel electrodes;
an opposed electrode provided on the second substrate to face the plurality of pixel electrodes so as to form a plurality of pixels in areas facing the plurality of pixel electrodes;
a plurality of touch input contact points provided on either one of the pixel electrodes and the opposed electrode, the plurality of touch input contact points protruding at a height smaller than the predetermined gap between the first and second substrates so as to respectively correspond to at least one previously selected pixel among the plurality of pixels, wherein the plurality of touch input contact points are brought into conduction with the other one of the pixel electrodes and the opposed electrode by a flexural deformation caused by a pressing force of a touch onto the first substrate or the second substrate; and
a liquid crystal layer sealed in the gap between the first substrate and the second substrate; and
a driver to selectively perform:
image data writing of sequentially turning on the plurality of thin-film transistors and supplying the image data signal from the signal lines to the plurality of respective pixel electrodes to write image data by applying a voltage corresponding to the image data signal to a space between the pixel electrodes and the opposed electrode; and
touch input detection of sequentially turning on the thin-film transistors to detect a potential in each of the plurality of signal lines during a period other than a period that the image data is written.

9. The apparatus according to claim 8, wherein the driver applies a common signal having a same potential to the opposed electrode at the time of the image data writing and the touch input detection.

10. The apparatus according to claim 9, wherein the driver includes:
a unit to apply the common signal to the opposed electrode;
a unit to sequentially apply the scanning signal to the plurality of scanning lines associated with the thin-film transistors in each row in accordance with each predetermined selection period;
a unit to supply the image data signal to the plurality of signal lines associated with the thin-film transistors in each column in accordance with each selection period for each row in synchronization with a period as a part in the selection period; and
a unit to detect a potential in each of the plurality of signal lines in synchronization with a period different from the period as the part in the selection period.

11. The apparatus according to claim 10, wherein the driver includes:
   a common signal generation circuit to apply the common signal to the opposed electrode;
   a scanning signal generation circuit to sequentially supply the scanning signal to the plurality of scanning lines in accordance with each predetermined selection period;
   a data signal generation circuit to supply the image data signal to the plurality of signal lines in accordance with each selection period for each row;
   a touch input detection unit to detect the potential in each of the plurality of signal lines and output positional data of a pixel in which the touch input contact point comes into contact with the other electrode based on the potential in each of the signal lines;
   a switching circuit to switch connection between the data signal generation circuit and the plurality of signal lines synchronized with the period as the part in the selection period and connection between the touch input detection unit and the plurality of signal lines synchronized with the other period in the selection period in accordance with each selection period for each row; and
   a control circuit to control the driver.

12. The apparatus according to claim 9, wherein the driver performs the image data writing and the touch input detection in accordance with each selection period for each row.

13. The apparatus according to claim 12, wherein the driver performs the touch input detection on an initial stage or a terminal stage of each selection period for each row and carries out the image data writing after the touch input detection or before the touch input detection in accordance with each selection period for each row.

14. A liquid crystal display device comprising:
   a first substrate;
   a second substrate arranged to face the first substrate with a predetermined gap between the first and second substrates;
   a plurality of pixel electrodes arranged on the first substrate;
   scanning lines arranged between the plurality of pixel electrodes;
   signal lines arranged between the plurality of pixel electrodes to be perpendicular to the scanning lines;
   a plurality of thin-film transistors arranged to be respectively connected with the plurality of pixel electrodes, wherein the plurality of thin-film transistors are turned on based on a scanning signal from the scanning lines which electrically connect the pixel electrodes to the signal lines through which an image data signal is supplied;
   an opposed electrode provided on the second substrate to face the plurality of pixel electrodes so as to form a plurality of pixels in areas facing the plurality of pixel electrodes;
   a plurality of touch input contact points provided on either (i) some of the pixel electrodes or (ii) the opposed electrode, the plurality of touch input contact points protruding at a height smaller than the predetermined gap between the first substrate and the second substrate so as to respectively correspond to at least a plurality of previously selected pixels among the plurality of pixels; and
   a liquid crystal layer sealed in the gap between the first substrate and the second substrate;
   wherein:
   the liquid crystal display device displays an image corresponding to the image data signal by sequentially turning on the thin-film transistors, supplying the image data signal to each of the plurality of pixel electrodes, and writing image data by applying a voltage corresponding to the image data signal between the plurality of pixel electrodes and the opposed electrode; and
   the plurality of touch input contact points are brought into conduction with the other of (i) the some of the pixel electrodes or (ii) the opposed electrode by flexural deformation caused by a pressing force of a touch on the first substrate or the second substrate.

15. The device according to claim 14, wherein the plurality of touch input contact points are provided on both the some of the pixel electrodes and the opposed electrode.

16. The device according to claim 14, wherein each of the plurality of touch input contact points comprises a protrusion provided on an inner surface of one of the first and second substrates, and a portion of one of the opposed electrode and the plurality of pixel electrodes is formed so as to cover the protrusion.

17. The device according to claim 14, wherein each of the plurality of touch input contact points is arranged to correspond to a central portion of a respective one of the plurality of pixels.

18. The device according to claim 14, wherein each of the plurality of touch input contact points is arranged at a peripheral portion of a respective one of the plurality of pixels.

19. The device according to claim 14, further comprising a plurality of spherical spacers dispersed between the first and second substrates, the plurality of spherical spacers being held between the first and second substrates to define the predetermined gap between the first and second substrates to have a value larger than the protrusion height of the plurality of touch input contact points.

20. The device according to claim 14, further comprising a plurality of columnar spacers provided between the first substrate and the second substrate, the plurality of columnar spacers being arranged to correspond to a region between adjacent the pixels to define the predetermined gap between the first and second substrates to have a value larger than the protrusion height of the plurality of touch input contact points.

21. The device according to claim 14, further comprising a light shielding film provided on an inner surface of one of the first and second substrates which is disposed on a display side to correspond to a region between adjacent pixels and the plurality of touch input contact points.

22. A liquid crystal display apparatus comprising:
   a liquid crystal display device including:
      a first substrate;
      a second substrate arranged to face the first substrate with a predetermined gap between the first and second substrates;
      a plurality of pixel electrodes arranged on the first substrate;
      scanning lines arranged between the plurality of pixel electrodes;
      signal lines arranged between the plurality of pixel electrodes to be perpendicular to the scanning lines;
      a plurality of thin-film transistors arranged to be respectively connected with the plurality of pixel electrodes, wherein the plurality of thin-film transistors are turned on based on a scanning signal from the scanning lines which electrically connect the pixel electrodes to the signal lines through which an image data signal is supplied, so as to supply the image data signal to the plurality of pixel electrodes;

an opposed electrode provided on the second substrate to face the plurality of pixel electrodes so as to form a plurality of pixels in areas facing the plurality of pixel electrodes;

a plurality of touch input contact points, provided on either one of the pixel electrodes and the opposed electrode, the plurality of touch input contact points protruding at a height smaller than the predetermined gap between the first and second substrates so as to respectively correspond to a plurality of previously selected pixels among the plurality of pixels, wherein the plurality of touch input contact portions are brought into conduction with the other one of the pixel electrodes and the opposed electrode by flexural deformation caused by a pressing force of a touch onto the first substrate or the second substrate; and a liquid crystal layer sealed in the gap between the first substrate and the second substrate; and a driver to selectively perform:

image data writing of sequentially turning on the plurality of thin-film transistors and supplying the image data signal to the plurality of respective pixel electrodes to write image data by applying a voltage corresponding to the image data signal to a space between the pixel electrodes and the opposed electrode; and touch input detection of sequentially turning on the thin-film transistors to detect a potential in each of the plurality of signal lines during a period other than a period that the image data is written when the plurality of thin-film transistors are in an ON period.

23. The apparatus according to claim 22, wherein the driver applies a common signal having a same potential to the opposed electrode at the time of the image data writing and the touch input detection.

24. The apparatus according to claim 23, wherein the driver includes:

a unit to apply the common signal to the opposed electrode;

a unit to sequentially supply the scanning signal to the plurality of scanning lines corresponding to the thin-film transistors in respective rows in accordance with each predetermined selection period;

a unit to supply the image data signal to the plurality of signal lines corresponding to the thin-film transistors in respective columns in accordance with each selection period for each row in synchronization with a period as a part in the selection period; and a unit to detect the potential in each of the plurality of signal lines in synchronization with a period different from the period as a part in the selection period.

25. The apparatus according to claim 24, wherein the driver includes:

a common signal generation circuit to apply the common signal to the opposed electrode;

a scanning single generation circuit to sequentially supply the scanning signal to the plurality of scanning lines in accordance with each predetermined selection period;

a data signal generation circuit to supply the image data signal to the plurality of signal lines in accordance with each selection period for each row;

a touch input detection unit to detect the potential in each of the plurality of signal lines and output positional data of a pixel in which the touch input contact point comes into contact with the other electrode based on the potential in each of the signal lines;

a switching circuit to switch connection between the data signal generation circuit and the plurality of signal lines synchronized with the period as the part in the selection period and connection between the touch input detection unit and the plurality of signal lines synchronized with the other period in the selection period in accordance with each selection period for each row; and a control circuit to control the driver.

26. The apparatus according to claim 22, wherein the driver performs the image data writing and the touch input detection in accordance with each period for each row.

27. The apparatus according to claim 26, wherein the driver performs the touch input detection on an initial stage or a terminal stage of each selection period for each row and carries out the image data writing after the touch input detection or before the touch in put detection in accordance with each selection period for each row.

* * * * *